(12) United States Patent
Khawaji et al.

(10) Patent No.: US 11,707,720 B2
(45) Date of Patent: Jul. 25, 2023

(54) INTEGRATED LOOP SYSTEMS FOR CATALYST REGENERATION IN MULTI-ZONE FLUIDIZED BED REACTORS AND METHODS OF USING THE SAME

(71) Applicants: Saudi Arabian Oil Company, Dhahran (SA); King Abdullah University of Science and Technology, Thuwal (SA)

(72) Inventors: Motaz Khawaji, Thuwal (SA); Ola Ali, Thuwal (SA); Khalid Al-Majnouni, Thuwal (SA); Wei Xu, Thuwal (SA); Jorge Gascon Sabate, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 300 days.

(21) Appl. No.: 17/164,137

(22) Filed: Feb. 1, 2021

(65) Prior Publication Data

US 2022/0241746 A1  Aug. 4, 2022

(51) Int. Cl.
*B01J 8/18* (2006.01)
*B01J 8/26* (2006.01)
*C10G 11/18* (2006.01)

(52) U.S. Cl.
CPC ............. *B01J 8/26* (2013.01); *B01J 8/1872* (2013.01); *C10G 11/182* (2013.01)

(58) Field of Classification Search
CPC .. B01J 8/26; B01J 8/1872; B01J 2208/00938; B01J 2208/00991; B01J 8/0035; B01J 8/001; B01J 8/1827; B01J 8/1881; C10G 11/182
USPC .......................................................... 422/144
See application file for complete search history.

(56) References Cited

U.S. PATENT DOCUMENTS

| 2,891,905 | A | 6/1959 | Wood |
| 5,582,712 | A | 12/1996 | Zinke et al. |
| 7,026,262 | B1 | 4/2006 | Palmas et al. |
| 7,919,536 | B2 | 4/2011 | Zhang et al. |

(Continued)

FOREIGN PATENT DOCUMENTS

EP           180291 A1     5/1986

OTHER PUBLICATIONS

International Search Report and Written Opinion dated Oct. 14, 2021 pertaining to International application No. PCT/US2021/033359 filed May 20, 2021, 15 pages.

*Primary Examiner* — Huy Tram Nguyen
(74) *Attorney, Agent, or Firm* — Dinsmore & Shohl LLP

(57) ABSTRACT

A multi-zoned fluidized bed reactor system may include a multi-zoned fluidized bed reactor and at least one catalyst regeneration loop. The multi-zoned fluidized bed reactor comprising a housing, a fluid bed distributor plate positioned at the bottom of the housing, a fluidized catalyst bed disposed vertically above the fluid bed distributor plate and a condensation zone disposed vertically above the fluidized catalyst bed. The at least one catalyst regeneration loop may be fluidly coupled to the stripping zone and a reaction zone. The at least one catalyst regeneration loop may be operable to withdraw a portion of spent catalyst from the stripping zone, regenerate the portion of spent catalyst to produce regenerated catalyst, and return the regenerated catalyst to the reaction zone. A method of regenerating catalyst in a multi-zoned fluidized bed reactor may include passing a portion of spent catalyst from a stripping zone to a catalyst regeneration loop.

20 Claims, 10 Drawing Sheets

(56) References Cited

U.S. PATENT DOCUMENTS 8,927,449 B2 1/2015 Dziabis et al.
2019/0256439 A1 8/2019 Zhang et al.

INTEGRATED LOOP SYSTEMS FOR CATALYST REGENERATION IN MULTI-ZONE FLUIDIZED BED REACTORS AND METHODS OF USING THE SAME

BACKGROUND

Field

The present specification generally relates to chemical processing and, more specifically, to systems and methods for regenerating spent catalyst.

Technical Background

Hydrocarbon feeds, such as crude oils, can be converted to chemical products and intermediates such as olefins and aromatic compounds, which are basic intermediates for a large portion of the petrochemical industry. The worldwide increasing demand for light olefins and aromatic compounds remains a major challenge for many integrated refineries. In particular, the production of some valuable light olefins, such as ethylene, propene, and butenes, has attracted increased attention as pure olefin streams are considered to be valuable building blocks for polymer synthesis. Additionally, aromatic compounds such as benzene, toluene, ethylbenzene, and xylenes can be valuable intermediates for synthesizing polymers and other organic compounds as well as for fuel additives.

The fluidized catalytic cracking (FCC) unit is one of the primary hydrocarbon conversion units in the modern petroleum refinery. The FCC unit may convert high-boiling, high molecular weight hydrocarbon feeds into more valuable chemical products such as gasoline, propylene, olefins, or aromatic compounds. Conventional FCC reactor systems may include an FCC unit and a catalyst regeneration unit. The FCC unit generally refers to a portion of the reactor system in which the major process reaction takes place, such as the upgrading of a hydrocarbon feed. The FCC unit may include a riser portion, a reaction zone, and a separation zone. A hydrocarbon feed may be introduced to the reaction zone of the FCC unit with steam or other suitable gas for atomization of the hydrocarbon feed. The hydrocarbon feed may be admixed and contacted with an effective quantity of heated fresh or regenerated catalyst particles.

During operation of a conventional FCC unit, the catalyst particles may become coked, which may result in limited or non-existent access to the active catalytic sites of the catalyst particles. Catalyst particles containing coke deposits from the reaction may be passed continuously to the catalyst regeneration unit. In the catalyst regeneration unit, the coked catalyst particles may come into contact with a regeneration gas, which may combust coke deposited on the catalyst particles. After coke on the catalyst particles is combusted, regenerated catalyst particles may be conveyed from the catalyst regeneration unit to the FCC unit. Despite the many advances in FCC processes, the industry is constantly seeking improved systems and methods for upgrading hydrocarbons and regenerating catalyst.

SUMMARY

Over time, it has become clear that higher temperatures and longer contact times between hydrocarbons and catalyst in fluidized catalytic conversion processes can increase conversion of the hydrocarbons to valuable chemical products, intermediates, or both. Higher temperatures may be difficult to maintain when the catalyst regenerator (which is the source of heat) and the reactor modules are kept physically separated in different vessels, as is the case in conventional FCC units. Additionally, FCC riser and downer reactors are limited in length and thus, the maximum contact time between hydrocarbons and catalyst is also limited.

Ongoing needs exist for improved systems and methods for fluidized catalytic cracking to convert hydrocarbons to valuable chemical products, intermediates, or both. The present disclosure is directed to multi-zoned fluidized bed reactors that allow for the catalytic conversion of hydrocarbons to valuable chemical products, intermediates, or both in a single reactor unit. The multi-zoned fluidized bed reactors of the present disclosure provide an alternative to conventional FCC units. Compared to conventional FCC units, the multi-zoned fluidized bed reactors of the present disclosure are a less complex alternative. The multi-zoned fluidized bed reactors of the present disclosure may require less capital and operation expenditure compared to conventional FCC units as the entire operation may be contained in a single reactor vessel.

Regeneration of spent catalyst can be accomplished within the multi-zoned fluidized bed reactor. However, regeneration of spent catalyst in a regeneration zone of the multi-zoned fluidized bed reactor may lead to flue gases, such as carbon monoxide and carbon dioxide, from the combustion of coke on the spent catalyst being combined with the valuable chemical products, intermediates, or both produced from the reactions. Separating the valuable chemical products, intermediates, or both from the flue gas produced during catalyst regeneration may be difficult, costly, and time-consuming.

Thus, the multi-zoned fluidized bed reactor of the present disclosure includes one or a plurality of catalyst regeneration loops fluidly coupled to the multi-zoned fluidized bed reactor. The catalyst regeneration loop may remove spent catalyst from a stripping zone of the multi-zoned fluidized bed reactor; regenerate the spent catalyst in the catalyst regeneration loop; separate flue gas, water vapor, or both from the regenerated catalyst; and return the regenerated catalyst to the multi-zoned fluidized bed reactor for further processing. The catalyst regeneration loops may reduce the amount of flue gas co-mingled with the reaction products, thereby reducing the costs of separating the reaction products from the flue gas components. The regeneration loops may also provide for efficient and economical regeneration of spent catalyst with reduced energy requirements compared to conventional FCC system catalyst regenerators, among other features of the present disclosure.

According to one or more aspects, a multi-zoned fluidized bed reactor system may include a multi-zoned fluidized bed reactor system that may comprise a multi-zoned fluidized bed reactor. The multi-zoned fluidized bed reactor may comprise a housing, a fluid bed distributor plate positioned at the bottom of the housing, a fluidized catalyst bed disposed vertically above the fluid bed distributor plate, and a condensation zone disposed vertically above the fluidized catalyst bed. The fluidized catalyst bed may comprise a stripping zone and a reaction zone disposed vertically above the stripping zone. The multi-zoned fluidized bed reactor system may further include at least one catalyst regeneration loop fluidly coupled to the stripping zone and the reaction zone. An inlet of the at least one catalyst regeneration loop may be in fluid communication with the stripping zone of the fluidized catalyst bed, and an outlet of the at least one catalyst regeneration loop may be in fluid communication with the reaction zone of the fluidized catalyst bed. The at least one catalyst regeneration loop may be operable to withdraw a portion of spent catalyst from the stripping zone, regenerate the portion of spent catalyst to produce regenerated catalyst, and return the regenerated catalyst to the reaction zone.

According to one or more other aspects, a method of regenerating catalyst in a multi-zoned fluidized bed reactor may comprise passing a portion of spent catalyst from a stripping zone of the multi-zoned fluidized bed reactor to a catalyst regeneration loop of the multi-zoned fluidized bed reactor; contacting the portion of spent catalyst with a regeneration gas in the catalyst regeneration loop to produce regenerated catalyst; separating flue gas, water vapor, or both from the regenerated catalyst in the catalyst regeneration loop; and returning the regenerated catalyst from the catalyst regeneration loop to a reaction zone of the multi-zoned fluidized bed reactor. The multi-zoned fluidized bed reactor may comprise a fluidized catalyst bed and a condensation zone disposed vertically above the fluidized catalyst bed. The fluidized catalyst bed may comprise the stripping zone and a reaction zone disposed vertically above the striping zone. An inlet of the catalyst regeneration loop may be in fluid communication with the stripping zone of the fluidized catalyst bed, and an outlet of the catalyst regeneration loop may be in fluid communication with the reaction zone of the fluidized catalyst bed.

Additional features and advantages will be set forth in the detailed description that follows, and in part will be readily apparent to those skilled in the art from that description or recognized by practicing the embodiments described in the present disclosure, including the detailed description which follows and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
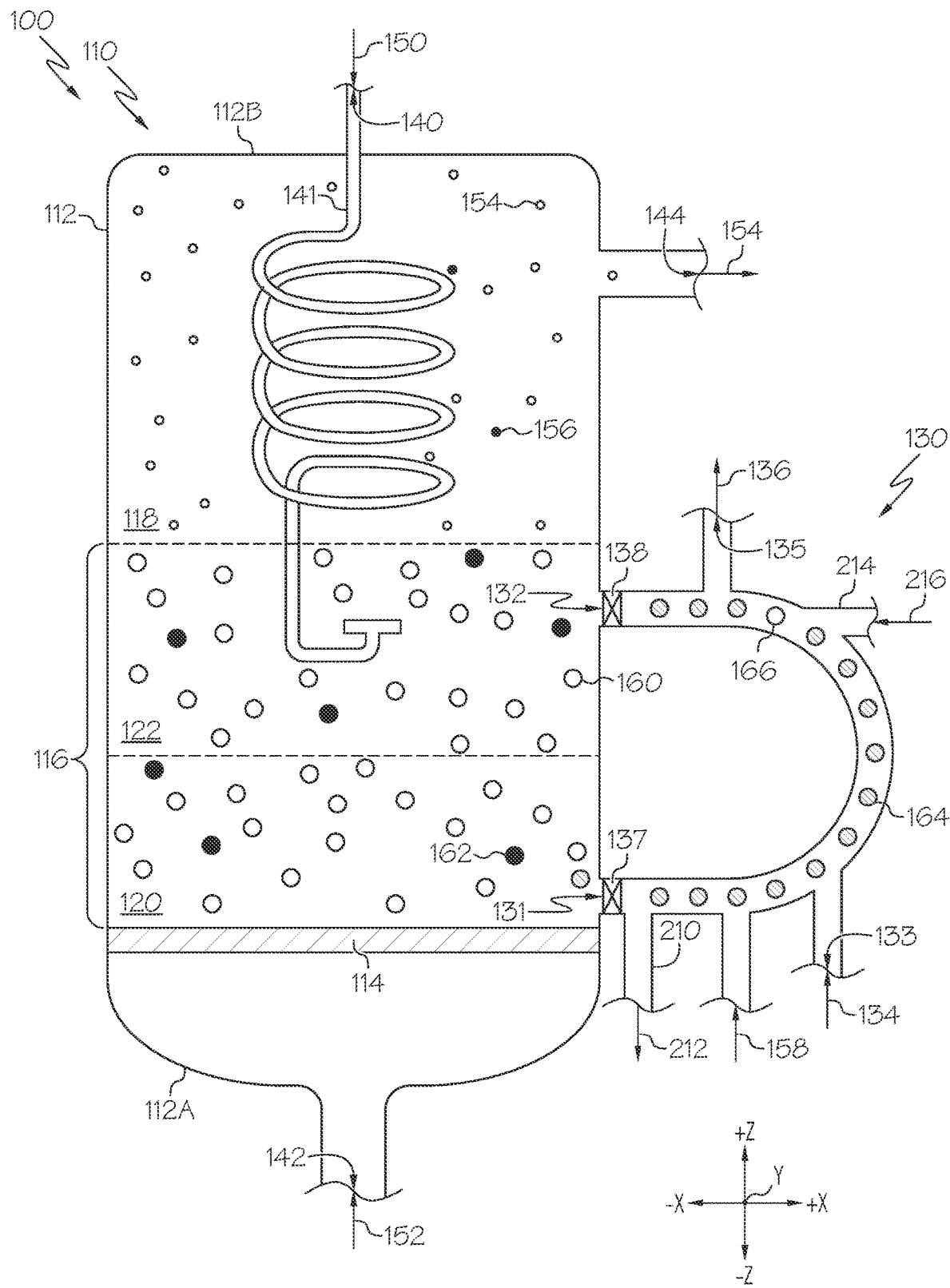
FIG. 1 schematically depicts a multi-zoned fluidized bed reactor system, according to one or more embodiments shown and described in the present disclosure.

For the purpose of describing the simplified schematic illustrations and descriptions of FIGS. 1-10, the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems may not be depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Reference will now be made in greater detail to various embodiments of the present disclosure, some embodiments of which are illustrated in the accompanying drawings.

DETAILED DESCRIPTION

The present disclosure is directed to multi-zoned fluidized bed reactor systems for fluidized catalytic upgrading of hydrocarbons to one or more valuable chemical products or intermediates and regenerating the catalyst. In particular, the multi-zoned fluidized bed reactor systems of the present disclosure may comprise a multi-zoned fluidized bed reactor and a catalyst regeneration loop. Referring to FIG. 1, one embodiment of a multi-zoned fluidized bed reactor system 100 is schematically depicted. The multi-zoned fluidized bed reactor system 100 may include a multi-zoned fluidized bed reactor 110 and a catalyst regeneration loop 130. The multi-zoned fluidized bed reactor 110 may include a housing 112, a fluid bed distributor plate 114 positioned at the bottom 112A of the housing 112, a fluidized catalyst bed 116 disposed vertically above (e.g., in the +Z direction of the coordinate axis of FIG. 1) the fluid bed distributor plate 114 and a condensation zone 118 disposed vertically above (e.g., in the +Z direction of the coordinate axis of FIG. 1) the fluidized catalyst bed 116. The fluidized catalyst bed 116 may include a stripping zone 120 and a reaction zone 122 disposed vertically above (e.g., in the +Z direction of the coordinate axis of FIG. 1) the stripping zone 120. The catalyst regeneration loop 130 may be fluidly coupled to the stripping zone 120 and the reaction zone 122. An inlet 131 of the catalyst regeneration loop 130 may be in fluid communication with the stripping zone 120 of the fluidized catalyst bed 116. An outlet 132 of the catalyst regeneration loop 130 may be in fluid communication with the reaction zone 122 of the fluidized catalyst bed 116. The catalyst regeneration loop 130 may be operable to withdraw a portion of spent catalyst 164 from the stripping zone 120, regenerate the portion of spent catalyst 164 to produce regenerated catalyst 166, and return the regenerated catalyst 166 to the reaction zone 122. Additional details of the multi-zoned fluidized bed reactor 110 may be found in U.S. Patent Application No. 62/771,789.

The present disclosure is also directed to methods of regenerating catalyst in multi-zoned fluidized bed reactor systems 100. In particular, the methods may include passing a portion of spent catalyst 164 from a stripping zone 120 of the multi-zoned fluidized bed reactor 110 to a catalyst regeneration loop 130 of the multi-zoned fluidized bed reactor 110, contacting the portion of spent catalyst 164 with a regeneration gas 134 in the catalyst regeneration loop 130 to produce regenerated catalyst 166, separating flue gas 136, water vapor, or both from the regenerated catalyst 166 in the catalyst regeneration loop 130, and returning the regenerated catalyst 166 from the catalyst regeneration loop 130 to a reaction zone 122 of the multi-zoned fluidized bed reactor 110.

The various multi-zoned fluidized bed reactor systems 100 for regenerating catalyst and methods of regenerating catalyst may provide increased efficiency for regenerating catalyst compared to conventional systems and methods of regenerating catalyst and compared to regenerating the catalyst 160 within a regeneration zone in the multi-zoned fluidized bed reactor 110. That is, the various multi-zoned fluidized bed reactor systems 100 for regenerating catalyst and methods of regenerating catalyst may effectively and efficiently regenerate catalyst 160 while also separating combustion products ($CO_2$ and CO) from the regenerated catalyst and reducing the mixing of combustion products with the reaction products in the multi-zoned fluidized bed reactor 110. The various systems and methods for regenerating catalyst may also allow for heat management and flexible operation by controlling parameters in the catalyst regeneration loop 130 such as residence time, catalyst volume, fluidization bed type, and degree of coke combustion, among other features. Other features and benefits of the systems of the present disclosure may be apparent to persons of ordinary skill in the art through practicing the subject matter of the present disclosure.

As used throughout the present disclosure, the term "light olefins" may refer to one or more of ethylene, propylene, butenes, or combinations of these.

As used throughout the present disclosure, the term "butene" or "butenes" may refer to one or more than one isomer of butene, such as one or more of 1-butene, trans-2-butene, cis-2-butene, isobutene, or mixtures of these isomers. As used throughout the present disclosure, the term "normal butenes" may refer to one or more than one of 1-butene, trans-2-butene, cis-2-butene, or mixtures of these isomers, and does not include isobutene. As used throughout the present disclosure, the term "2-butene" may refer to trans-2-butene, cis-2-butene, or a mixture of these two isomers.

As used throughout the present disclosure, the term "crude oil" or "whole crude oil" may refer to crude oil received directly from an oil field or from a desalting unit without having any fraction separated by distillation.

As used in this disclosure, a "catalyst" may refer to any substance that increases the rate of a specific chemical reaction. Catalysts described in this disclosure may be utilized to promote various reactions, such as, but not limited to, cracking (including aromatic cracking), demetalization, desulfurization, and, denitrogenation. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

As used in this disclosure, a "fluidized bed reactor" may refer to a reactor used to carry out multiphase reactions. In a fluidized bed reactor, a fluid (e.g., fluidization gas) may be passed through a solid or granular catalyst material at sufficient velocity to cause the catalyst material to behave as if it were a fluid.

Referring now to FIG. 1, multi-zoned fluidized bed reactor systems 100 may include a multi-zoned fluidized bed reactor 110 and a catalyst regeneration loop 130. The multi-zoned fluidized bed reactor 110 may include a housing 112, a fluid bed distributor plate 114, a fluidized catalyst bed 116, and a condensation zone 118. The fluid bed distributor plate 114 may be positioned at or proximate to the bottom 112A of the housing 112. The fluidized catalyst bed 116 may be disposed within the housing 112 and vertically above (e.g., in the +Z direction of the coordinate axis of FIG. 1) the fluid bed distributor plate 114. The condensation zone 118 may be disposed within the housing 112 and vertically above (e.g., in the +Z direction of the coordinate axis of FIG. 1) the fluidized catalyst bed 116. The fluidized catalyst bed 116 may include a stripping zone 120 and a reaction zone 122. The stripping zone 120 may be disposed vertically above (e.g., in the +Z direction of the coordinate axis of FIG. 1) the fluid bed distributor plate 114. The reaction zone 122 may be disposed vertically above (e.g., in the +Z direction of the coordinate axis of FIG. 1) the stripping zone 120, such as between the stripping zone 120 and the condensation zone 118.

The catalyst regeneration loop 130 may be fluidly coupled to the stripping zone 120 and to the reaction zone 122. The catalyst regeneration loop 130 may comprise an inlet 131 and an outlet 132. The inlet 131 of the catalyst regeneration loop 130 may be in fluid communication with the stripping zone 120 of the fluidized catalyst bed 116. The outlet 132 of the catalyst regeneration loop 130 may be in fluid communication with the reaction zone 122 of the fluidized catalyst bed 116. The catalyst regeneration loop 130 may be operable to withdraw a portion of spent catalyst 164 from the stripping zone 120, regenerate the portion of spent catalyst 164 to produce regenerated catalyst 166, and return the regenerated catalyst 166 to the reaction zone 122.

Referring again to FIG. 1, the housing 112 be any vessel that houses the various zones and components of the multi-zoned fluidized bed reactor 110. The housing 112 may be a single vessel containing the various zones. The housing 112 may enclose the stripping zone 120, the reaction zone 122, and the condensation zone 118. The housing 112 may also include various inlets and outlets. The housing 112 may include at least one hydrocarbon feed inlet 140, at least one fluidization gas inlet 142, and at least one chemical product outlet 144. These various inlets and outlets are described in further detail below.

The hydrocarbon feed inlet 140 may be positioned at or near the top 112B of the housing 112 of the multi-zoned fluidized bed reactor 110. The hydrocarbon feed inlet 140 may be in fluid communication with a hydrocarbon feed coil pipe 141. The hydrocarbon feed coil pipe 141 may pass a hydrocarbon feed 150 from the hydrocarbon feed inlet 140 to the reaction zone 122. The hydrocarbon feed 150 entering the hydrocarbon feed coil pipe 141 may be at a cooler temperature than the inside of the multi-zoned fluidized bed reactor 110. The hydrocarbon feed 150 in the hydrocarbon feed coil pipe 141 may be heated up through heat transfer through the walls of the hydrocarbon feed coil pipe 141 prior to being discharged from the hydrocarbon feed coil pipe 141 into the reaction zone 122. The relatively cool hydrocarbon feed 150 in the hydrocarbon feed coil pipe 141 may also reduce the temperature in the multi-zoned fluidized bed reactor 110. The reduced temperature of the hydrocarbon feed coil pipe 141 may act as a condenser to condense unreacted hydrocarbons and other larger molecular weight hydrocarbons so that they can be reintroduced to the reaction zone 122.

The fluidization gas inlet 142 may be positioned at or near the bottom 112A of the housing 112 of the multi-zoned fluidized bed reactor 110. The fluidization gas inlet 142 may pass a fluidization gas 152 into the multi-zoned fluidized bed reactor 110. As the fluidization gas 152 enters the multi-zoned fluidized bed reactor 110, the fluidization gas 152 may propagate through the fluid bed distributor plate 114 and enter the fluidized catalyst bed 116. As the fluidization gas 152 enters the fluidized catalyst bed 116, the velocity of the fluidization gas 152 may agitate the catalyst 160 and any coke 162 in the fluidized catalyst bed 116. That is, the fluidization gas 152 may fluidize the catalyst 160 in the fluidized catalyst bed 116 such that the catalyst 160 in the fluidized catalyst bed 116 is distributed in the multi-zoned fluidized bed reactor 110. The fluidization gas 152 may also strip hydrocarbon gases from the catalyst 160 in the stripping zone 120. As hydrocarbon gases are stripped from the catalyst 160 in the stripping zone 120, the fluidization gas 152 may also transport or convey the hydrocarbon gases upward (e.g. in the +Z direction of the coordinate axis of FIG. 1) back to the reaction zone 122 for further processing. The fluidization gas 152 may help reduce coke 162, coke precursors, or both in the multi-zoned fluidized bed reactor 110. The fluidization gas 152 may be an inert gas that does not participate, or only minimally participates, in the chemical reactions in the reaction zone 122. The fluidization gas 152 may include water, water vapor, nitrogen, other chemical elements, or combinations of these to help reduce coke 162, coke precursors, or both in the multi-zoned fluidized bed reactor 110.

The chemical product outlet 144 may be positioned at or near the top 112B of the housing 112 of the multi-zoned fluidized bed reactor 110. The chemical product outlet 144 may be in fluid communication with the condensation zone 118 of the multi-zoned fluidized bed reactor 110. The chemical product outlet 144 may pass a multi-zoned fluidized bed reactor effluent 154 obtained from the reaction of the hydrocarbon feed 150 out of the multi-zoned fluidized bed reactor 110. The multi-zoned fluidized bed reactor effluent 154 may include, but is not limited to, light olefins (including ethylene, propylene, butenes, or combinations of these), gasoline, and other aromatic compounds.

Referring again to FIG. 1, the fluid bed distributor plate 114 may be a perforated or porous plate. The fluid bed distributor plate 114 may be disposed at or near the bottom 112A of the housing 112 of the multi-zoned fluidized bed reactor 110. The fluid bed distributor plate 114 may support the fluidized catalyst bed 116. The fluidized catalyst bed 116 may comprise the stripping zone 120 and the reaction zone 122. The fluid bed distributor plate 114 may also agitate and distribute the fluidization gas 152 as it enters the multi-zoned fluidized bed reactor 110. As the fluidization gas 152 enters the multi-zoned fluidized bed reactor 110, the fluid bed distributor plate 114 may distribute the fluidization gas 152 such that stable and uniform fluidization across the entire cross-section of the fluidized catalyst bed 116 may be ensured. The fluidized catalyst bed 116 supported by the fluid bed distributor plate 114 may initially (i.e., before any reactions take place) include only catalyst 160. Initially, there may not be any coke 162 deposited on the catalyst 160 in the fluidized catalyst bed 116. Additionally or alternatively, the catalyst 160 may be combined with the hydrocarbon feed 150. That is, the catalyst 160 may be supplied to the multi-zoned fluidized bed reactor 110 simultaneously with the hydrocarbon feed 150 as a mixture or slurry. As further discussed in the present disclosure, as the multi-zoned fluidized bed reactor 110 is used over a period of time, coke 162 may begin to deposit on the catalyst 160, on the housing 112, or a combination of both.

The stripping zone 120 of the multi-zoned fluidized bed reactor 110 may be disposed vertically above (e.g., in the +Z direction of the coordinate axis of FIG. 1) the fluid bed distributor plate 114. During operation of the multi-zoned fluidized bed reactor 110, non-reacted hydrocarbons (i.e., coke precursors) may be adsorbed by the catalyst 160, such as into the porous structures of individual catalyst particles or in interstitial regions of agglomerates of catalyst particles. In the stripping zone 120, non-reacted hydrocarbons that have been adsorbed on the catalyst 160 may be stripped from the catalyst 160. At least a portion of these non-reacted hydrocarbons may be removed from the catalyst 160 by flow of the fluidization gases 152, the temperature in the multi-zoned fluidized bed reactor 110, or both. The upward flowing of a fluidization gas 152 may partially desorb the non-reacted hydrocarbons that have been adsorbed on the catalyst 160. The fluidization gas 152 may not react with the non-reacted hydrocarbons. That is, the fluidization gas 152 may remain chemically unchanged as it interacts with the non-reacted hydrocarbons that have been adsorbed on the catalyst 160.

The catalyst 160 may be any catalyst capable of conducting the desired reactions in the reaction zone 122. In embodiments, the catalyst 160 may include, without limitation, one or more of zeolites, silica-alumina catalysts, carbon monoxide burning promoter additives, bottoms cracking additives, light olefin-producing additives, other catalyst additives, or combinations of these components. Zeolites that may be used in at least a portion of the catalyst 160 may include, but are not limited to Y, REY, USY, RE-USY zeolites, or combinations of these. The catalyst 160 may also include a shaped selective catalyst additive, such as ZSM-5 zeolite crystal or other pentasil-type catalyst structures, which are often used in other fluidized catalytic cracking processes to produce light olefins and/or increase fluidized catalytic cracking gasoline octane. The catalyst 160 may include a mixture of a ZSM-5 zeolite crystal and the cracking catalyst zeolite and matrix structure of a conventional fluidized catalytic cracking catalyst. The catalyst 160 may be a mixture of Y and ZSM-5 zeolite catalysts embedded with clay, alumina, and binder.

The catalyst 160 may have a Geldart classification A (aeratable) or B (sand-like). The catalyst 160 may have an average particle size ranging from 10 micrometers to 200 micrometers. The catalyst 160 may have a skeletal density ranging from 0.5 kilograms per cubic meter ($kg/m^3$) to 3.0 $kg/m^3$. As used in the present disclosure, "skeletal density" may refer to the density of the catalyst 160 material that constitutes the catalyst particle, without porosity.

The non-reacted hydrocarbons may potentially reduce the activity of the catalyst 160. The non-reacted hydrocarbons may eventually become coke 162 deposited on the catalyst 160. Coke 162 deposited on the catalyst 160 may block the catalytically active sites of the catalyst 160. Catalytically active sites may refer to sites on the catalyst that may be responsible for catalysing or promoting the desired reaction or reactions in the multi-zoned fluidized bed reactor 110. Coke 162 deposits can block these catalytically active sites on the catalyst 160 to prevent reactants from accessing these sites, thereby reducing the catalytic activity of the catalyst 160. As will be further described, catalyst 160 with coke 162 deposited on the catalyst 160 (referred to as "spent catalyst" 164) may be regenerated in the catalyst regeneration loop 130.

Referring again to FIG. 1, the reaction zone 122 may be disposed vertically above (e.g., in the +Z direction of the coordinate axis of FIG. 1) the stripping zone 120. The reaction zone 122 may also be disposed vertically below (e.g., in the −Z direction of the coordinate axis of FIG. 1) the condensation zone 118. In the reaction zone 122, the hydrocarbon feed 150 may be contacted with the catalyst 160. In the presence of the catalyst 160, and at operating conditions of the multi-zoned fluidized bed reactor 110, at least a portion of the hydrocarbons from the hydrocarbon feed 150 may undergo one or more cracking reactions to produce the multi-zoned fluidized bed reactor effluent 154, which may include one or more chemical products 156 or intermediates.

The reaction zone 122 of the multi-zoned fluidized bed reactor 110 may include the hydrocarbon feed 150, catalyst 160, fluidization gas 152, coke 162, coke precursors, or combinations of these. The reaction zone 122 may be the portion of the multi-zoned fluidized bed reactor 110 where a majority of the hydrocarbon feed 150 may be converted to the one or more chemical products 156 or intermediates of the multi-zoned fluidized bed reactor effluent 154. It should be appreciated that a portion of the hydrocarbon feed 150 may also be converted to one or more chemical products 156 or intermediates of the multi-zoned fluidized bed reactor effluent 154 in the stripping zone 120, the condensation zone 118, or the catalyst regeneration loop 130, but that the majority of the conversion of the hydrocarbon feed 150 will occur in the reaction zone 122.

Referring again to FIG. 1, the condensation zone 118 may be disposed vertically above (e.g., in the +Z direction of the coordinate axis of FIG. 1) the reaction zone 122. The condensation zone 118 may extend vertically upward (e.g., in the +Z direction of the coordinate axis of FIG. 1) from the top of the reaction zone 122 to the top 112B of the housing 112. The one or more chemical products 156 or intermediates of the multi-zoned fluidized bed reactor effluent 154 produced in the multi-zoned fluidized bed reactor 110 may pass vertically upward (e.g., in the +Z direction of the coordinate axis of FIG. 1) from the reaction zone 122 of the fluidized catalyst bed 116 to the condensation zone 118. Prior to being passed out of the multi-zoned fluidized bed reactor 110, the one or more chemical products 156 or intermediates of the multi-zoned fluidized bed reactor effluent 154 in the condensation zone 118 may preheat the hydrocarbon feed 150 in the hydrocarbon feed coil pipe 141. As the one or more chemical products 156 and intermediates of the multi-zoned fluidized bed reactor effluent 154 in the condensation zone 118 preheat the hydrocarbon feed 150 in the hydrocarbon feed coil pipe 141, heavier constituents of the chemical products 156 (i.e., portions of the multi-zoned fluidized bed reactor effluent 154 having a higher boiling point) may condense and pass vertically from the condensation zone 118 back to the reaction zone 122.

By controlling the temperature of the multi-zoned fluidized bed reactor 110 and the condensation zone 118, only gaseous chemical products 156 or intermediates of the multi-zoned fluidized bed reactor effluent 154 resulting from the reaction in the multi-zoned fluidized bed reactor 110 may pass vertically from the reaction zone 122 to the condensation zone 118. Additionally, by modifying the diameter of the multi-zoned fluidized bed reactor 110, and therefore the condensation zone 118, it may be possible to reduce the presence of catalyst 160, coke 162, coke precursors, or a combination of these in the condensation zone 118. Modifying the diameter of the multi-zoned fluidized bed reactor 110 may reduce velocities in the condensation zone 118, which may reduce the carryover of catalyst 160, coke 162, coke precursors, or a combination of these in the condensation zone 118. While some catalyst 160, coke 162, coke precursors, or a combination of these may be present in the condensation zone 118, it is preferable that the amount of catalyst 160, coke 162, and coke precursors present in the condensation zone 118 be kept at a minimum.

The positioning of the condensation zone 118 vertically above (e.g., in the +Z direction of the coordinate axis of FIG. 1) the reaction zone 122 may reduce or eliminate the need for recycling the multi-zoned fluidized bed reactor effluent 154 being passed out of the multi-zoned fluidized bed reactor 110, as heavier constituents of the chemical products 156 may be condensed and returned to the reaction zone 122 for further processing, such as undergoing further reaction.

While FIG. 1 illustrates specific vertical separation of the stripping zone 120, the reaction zone 122, and the condensation zone 118, one skilled in the art will appreciate that the stripping zone 120, the reaction zone 122, and the condensation zone 118 may not have strict boundaries. Instead, where two zones meet, the characteristics of a first zone will slowly transform to the characteristics of a second zone. It is further noted that the size (i.e., volume) of the various zones (the stripping zone 120, the reaction zone 122, and the condensation zone 118) may be modified depending on the type of hydrocarbon feed 150, reaction, and the multi-zoned fluidized bed reactor effluent 154.

The ratio between the volumes of the stripping zone 120 and the reaction zone 122 may range from 1:1 to 20:1, such as from 5:1 to 15:1 or from 7:1 to 12:1. The ratio between the volumes of the reaction zone 122 and the condensation zone 118 may range from 50:1 to 0.5:1, such as from 20:1 to 0.5:1 or from 10:1 to 1:1. As previously stated in the present disclosure, the size of the condensation zone 118 may be modified depending on the hydrocarbon feed 150, reaction, and the multi-zoned fluidized bed reactor effluent 154, as well as the desired temperature in the condensation zone 118.

Referring to FIG. 1, during operation of the multi-zoned fluidized bed reactor 110, the hydrocarbon feed 150 may be introduced to the reaction zone 122 through the hydrocarbon feed coil pipe 141. The fluidization gas 152 may fluidize the catalyst 160 in the fluidized catalyst bed 116. In the reaction zone 122, the hydrocarbon feed 150 may be contacted with the catalyst 160 and a portion of the hydrocarbon feed 150 may undergo one or more cracking reactions to form one or more chemical products 156 or intermediates. The one or more chemical products 156 or intermediates may be gaseous and may rise to the condensation zone 118. In the condensation zone 118, heavier chemical products 156 or intermediates may condense and return back to the reaction zone 122, where further cracking may take place. The one or more chemical products 156 or intermediates, once separated from the heavier chemical products 156 or intermediates in the condensation zone 118, may be passed out of the multi-zoned fluidized bed reactor 110 in the multi-zoned fluidized bed reactor effluent 154. During operation of the multi-zoned fluidized bed reactor 110, coke 162 may deposit on the catalyst 160, as will be further described in the present disclosure. Catalyst 160 with coke 162 deposited on its surface may be referred to as spent catalyst 164. Spent catalyst 164 may be passed to the catalyst regeneration loop 130, where the spent catalyst 164 may be processed to regenerated catalyst 166, as will further be described in the present disclosure.

The operating conditions of the multi-zoned fluidized bed reactor 110 will now be described in greater detail. The temperature of the multi-zoned fluidized bed reactor 110 may range from 400 degrees Celsius (° C.) to 1,000° C., such as from 550° C. to 850° C. The pressure of the multi-zoned fluidized bed reactor 110 may range from 0.1 bar (10 kilopascal (kPa)) to 5 (500 kPa) bar, such as from 1 bar (100 kPa) to 4 bar (400 kPa) or from 1 bar (100 kPa) to 3 bar (300 kPa). The residence time in the multi-zoned fluidized bed reactor 110 may range from 0.1 seconds to 10 minutes, such as from 0.1 seconds to 1 minute or from 0.5 seconds to 1 minute.

When the portion of the hydrocarbon feed 150 contacts the catalyst 160 and is processed to produce one or more chemical products 156 and intermediates, carbonaceous deposits, commonly referred to as coke 162, may form on the catalyst 160 and deactivate the catalyst 160. To regenerate the spent catalyst 164, the spent catalyst 164 deactivated by coke 162 may be separated from the one or more chemical products 156 and intermediates, stripped of removable hydrocarbons in the stripping zone 120 by the fluidization gas 152, and passed to the catalyst regeneration loop 130 where coke 162 may be burned from the spent catalyst 164 in the presence of regeneration gas 134 to produce a regenerated catalyst 166 that is catalytically effective. The term "catalytically effective" refers to the ability of the regenerated catalyst 166 to enable the catalytic reaction. Although for purposes of efficiency it is most desirable to pass spent catalyst 164 to the catalyst regeneration loop 130, it is contemplated that catalyst 160 not having coke 162 deposited on its surface may also be passed to the catalyst regeneration loop 130. The catalyst 160 being passed to the catalyst regeneration loop 130 may not be entirely spent catalyst 164. However, it is noted that spent catalyst 164 having coke deposits may be heavier than catalyst 160 with lesser or no coke deposits and may migrate downward through the fluidized bed 116 to the stripping zone 120. Thus, the majority of the catalyst passed to the catalyst regeneration loop 130 may be spent catalyst 164.

Referring again to FIG. 1, the multi-zoned fluidized bed reactor 110 can include one or a plurality of catalyst regeneration loops 130. Each catalyst regeneration loop 130 may be in fluid communication with the multi-zoned fluidized bed reactor 110. Each catalyst regeneration loop 130 may include an inlet 131 and an outlet 132. The inlet 131 of the catalyst regeneration loop 130 may be in fluid communication with the stripping zone 120 of the fluidized catalyst bed 116. The outlet 132 of the catalyst regeneration loop 130 may be in fluid communication with the reaction zone 122 of the fluidized catalyst bed 116. The catalyst regeneration loop 130 may be operable to combust a portion of coke 162 present on the spent catalyst 164 while the spent catalyst 164 is in the catalyst regeneration loop 130. The catalyst regeneration loop 130 may be operable to contact the spent catalyst 164 with one or more regeneration gases at a temperature sufficient to cause at least a portion of coke 162 on the spent catalyst 164 to undergo combustion.

The catalyst regeneration loop 130 may comprise a first slide valve 137 and a second slide valve 138. The first slide valve 137 may connect the stripping zone 120 to the inlet 131 of the catalyst regeneration loop 130. The second slide valve 138 may connect the outlet 132 of the catalyst regeneration loop 130 to the reaction zone 122. The first slide valve 137 and the second slide valve 138 may control whether spent catalyst 164 is withdrawn from the multi-zoned fluidized bed reactor 110 and whether regenerated catalyst 166 is returned to the multi-zoned fluidized bed reactor 110, respectively. The first slide valve 137 may control the portion of spent catalyst 164 withdrawn from the stripping zone 120. The second slide valve 138 may control the regenerated catalyst 166 returned to the reaction zone 122. The first slide valve 137 may withdraw spent catalyst 164 from the stripping zone 120 on a batch-wise or semi-continuous basis. The spent catalyst 164 may be withdrawn on a batch-wise or semi-continuous basis such that the spent catalyst 164 is permitted a sufficient residence time in the catalyst regeneration loop 130 for coke 162 deposited on the spent catalyst 164 to be combusted.

Referring still to FIG. 1, a lifting gas 158 may be introduced to the catalyst regeneration loop 130 to transport the spent catalyst 164 from the multi-zoned fluidized bed reactor 110 to, and through, the catalyst regeneration loop 130. The lifting gas 158 may include steam. Low-pressure, medium-pressure, or high-pressure steam may be used as the lifting gas 158. It may be preferable to use low-pressure steam as the lifting gas 158. Low-pressure steam may refer to steam having a pressure less than or equal to 2.5 bar (250 kPa). Medium-pressure steam may refer to steam having a pressure greater than 2.5 bar (250 kPa) and less than or equal to 16.5 bar (1.65 megapascals (MPa)). High-pressure steam may refer to steam having a pressure greater than 16.5 bar (1.65 MPa).

The catalyst regeneration loop 130 may further comprise a regeneration gas inlet 133 and a flue gas outlet 135. The regeneration gas inlet 133 may be in fluid communication with the catalyst regeneration loop 130. The regeneration gas inlet 133 may be at or near the inlet 131 of the catalyst regeneration loop 130. The regeneration gas inlet 133 may combine a regeneration gas 134 with the portion of spent catalyst 164 in the catalyst regeneration loop 130. The regeneration gas 134 may comprise air, oxygen, nitrogen, steam, or combinations of these. When the regeneration gas 134 comprises steam, the regeneration gas 134 may comprise high-pressure steam.

When the spent catalyst 164 is in the catalyst regeneration loop 130, at least a portion of coke 162 present on the spent catalyst 164 may be combusted. The regeneration gas 134 may contact the spent catalyst 164 at a temperature that may cause at least a portion of the coke 162 on the spent catalyst 164 to combust to produce a flue gas 136. The flue gas 136 may include but is not limited to carbon monoxide, carbon dioxide, water vapor, nitrogen oxides, sulfur oxides, or combinations of these. The flue gas 136 may include any other gases produced during combustion of the coke deposits. The combustion of at least a portion of the coke 162 present on the spent catalyst 164 may regenerate the catalyst 160 for further processing in the multi-zoned fluidized bed reactor 110.

Separation of flue gas 136 from multi-zoned fluidized bed reactor effluent 154 may be challenging, time-consuming, and costly. Therefore, efficiently and effectively separating flue gas 136 from the regenerated catalyst 166 may reduce or prevent co-mingling of flue gas 136 with the multi-zoned fluidized bed reactor effluent 154, which may reduce or eliminate challenges and costs associated with separating the flue gas 136 from the cracking effluent 154. The flue gas outlet 135 of the catalyst regeneration loop 130 may efficiently and effectively separate flue gas 136 produced from the combustion of coke 162 on the spent catalyst 164. The flue gas outlet 135 may be in fluid communication with the catalyst regeneration loop 130. The flue gas outlet 135 may remove at least a portion of the flue gas 136 from the regenerated catalyst 166 in the catalyst regeneration loop 130. By separating flue gas 136 and removing at least a portion of the flue gas 136 from the catalyst regeneration loop 130, a reduced amount of flue gas 136 may be introduced back into the multi-zoned fluidized bed reactor 110. Therefore, a reduced amount of flue gas 136 may be passed out of the multi-zoned fluidized bed reactor 110 with the multi-zoned fluidized bed reactor effluent 154. This may avoid or reduce the need for challenging, time-consuming, and costly separation of flue gas 136 from the multi-zoned fluidized bed reactor effluent 154.

Figure 2:
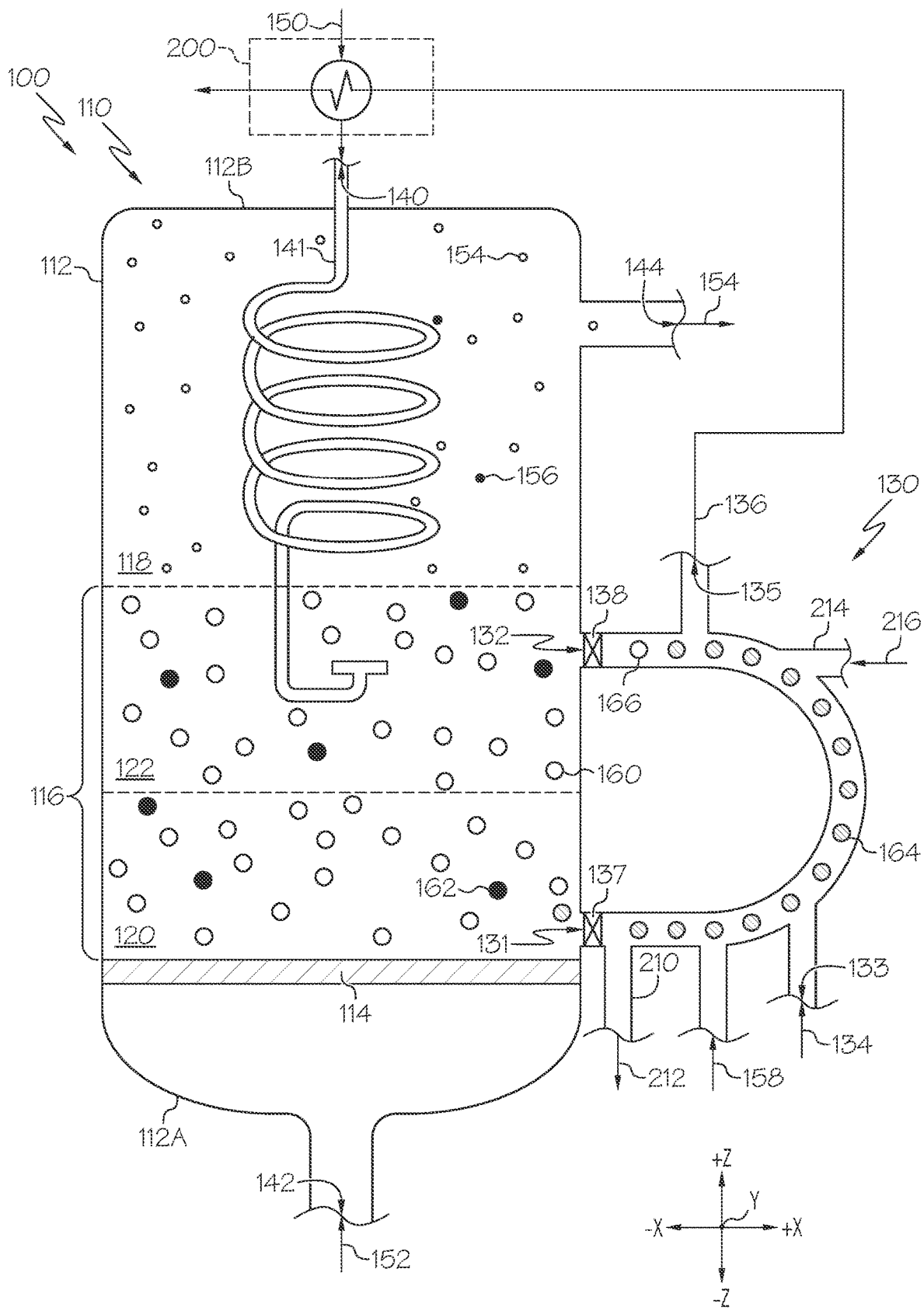
FIG. 2 schematically depicts a multi-zoned fluidized bed reactor system with a riser regenerator with a heat recovery unit, according to one or more embodiments shown and described in the present disclosure.

Referring now to FIG. 2, the flue gas outlet 135 may be in fluid communication with a heat recovery unit 200. As used in the present disclosure, a "heat recovery unit" may refer to a component where excess heat may be recycled to provide necessary heat to another component or stream where heat is needed. The heat recovery unit 200 may be a heat exchanger. The flue gas outlet 135 may pass the portion of the flue gas 136 to the heat recovery unit 200. The heat recovery unit 200 may preheat the hydrocarbon feed 150 or may generate low-pressure steam, medium-pressure steam, or high-pressure steam. As shown in FIG. 2, the heat recovery unit 200 may preheat the hydrocarbon feed 150 prior to the hydrocarbon feed 150 entering the multi-zoned fluidized bed reactor 110.

Referring again to FIG. 1, the catalyst regeneration loop 130 may be operable to remove a portion of spent catalyst 164 from the multi-zoned fluidized bed reactor 110. Some catalyst 160 having lesser amounts of coke deposits (i.e., non-spent catalyst) may also be removed from the multi-zoned fluidized bed reactor 110 and passed to the catalyst regeneration loop 130. The catalyst regeneration loop 130 may be operable to contact a portion of spent catalyst 164 from the multi-zoned fluidized bed reactor 110 with a regeneration gas 134. The regeneration gas 134, along with the operating conditions of the catalyst regeneration loop 130, may be operable to combust a portion of the coke 162 deposited on the spent catalyst 164. The coke 162 deposited on the spent catalyst 164 may combust to produce regenerated catalyst 166 and flue gas 136. The flue gas 136 may be separated from the regenerated catalyst 166 prior to the regenerated catalyst 166 being returned to the multi-zoned fluidized bed reactor 110. The catalyst regeneration loop 130 may be operated at a temperature sufficient to cause at least a portion of the coke on the spent catalyst to undergo combustion. In embodiments, the temperature in the catalyst regeneration loop 130 may range from 500° C. to 800° C., such as from 550° C. to 750° C. or from 600° C. to 700° C. The pressure in the catalyst regeneration loop 130 may range from 1 bar (100 kPa) to 10 bar (500 kPa) such as from 1 bar (100 kPa) to 4 bar (400 kPa) or from 1 bar (100 kPa) to 3 bar (300 kPa). The residence time in the catalyst regeneration loop 130 may be less than twenty minutes, such as from 3 seconds to 20 minutes, or from 5 minutes to 20 minutes.

The amount of spent catalyst 164 removed from the multi-zoned fluidized bed reactor 110 may be determined by balancing the target catalyst activity in the multi-zoned fluidized bed reactor 110 with the amount of energy needed to maintain the desired conversion of hydrocarbons to the one or more chemical products 156 or intermediates. The mass ratio between total amount of catalyst 160 in the multi-zoned fluidized bed reactor 110 and the catalyst regeneration loop 130 to the hydrocarbon feed 150 may range from 5.0 to 50.0, such as from 10.0 to 45.0, or from 15.0 to 40.0.

Referring again to FIG. 2, the catalyst regeneration loop 130 may further comprise a catalyst bleed 210 in fluid communication with the catalyst regeneration loop 130. The catalyst bleed 210 may remove a portion 212 of spent catalyst 164 from the catalyst regeneration loop 130. The portion 212 of spent catalyst 164 removed from the catalyst regeneration loop 130 may comprise 0.1 weight percent (wt. %) to 5.0 wt. % of the spent catalyst 164 transferred into the catalyst regeneration loop 130. Additionally or alternatively, the catalyst regeneration loop 130 may comprise a catalyst inlet 214 in fluid communication with the catalyst regeneration loop 130. The catalyst inlet 214 may introduce fresh catalyst 216 to the catalyst regeneration loop 130. It may be necessary to introduce fresh catalyst 216 to the catalyst regeneration loop 130 and the multi-zoned fluidized bed reactor 110 as catalyst 160 may become permanently deactivated through delamination, poisoning, or other means. Fresh catalyst 216 introduced to the catalyst regeneration loop 130 via the catalyst inlet 214 may be combined with regenerated catalyst 166 such that the fresh catalyst 216 is preheated by the regenerated catalyst 166 to avoid cold spots in the multi-zoned fluidized bed reactor 110.

Figure 8:
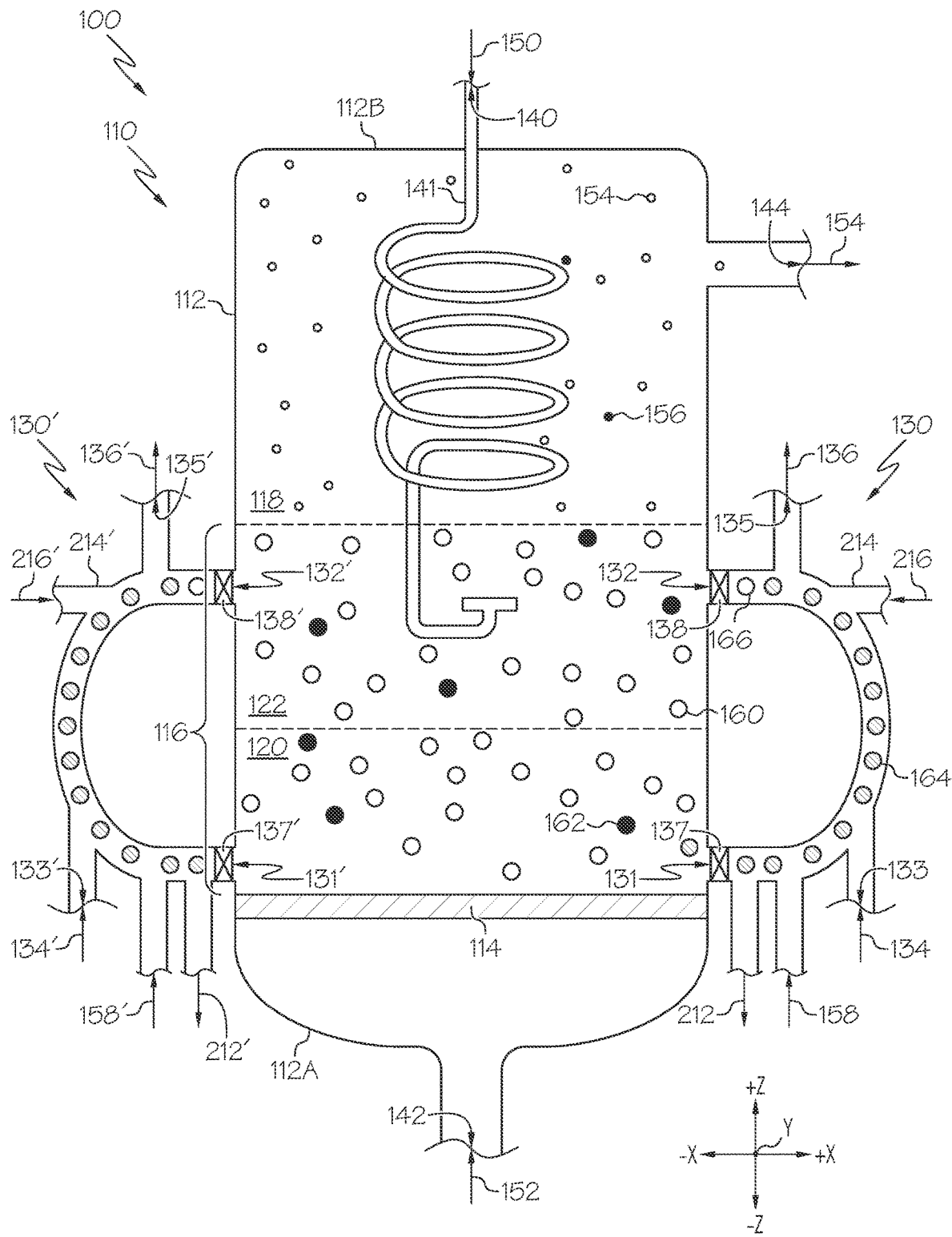
FIG. 8 schematically depicts a side view of a multi-zoned fluidized bed reactor system with two catalyst regeneration loops, according to one or more embodiments shown and described in the present disclosure.
Figure 9:
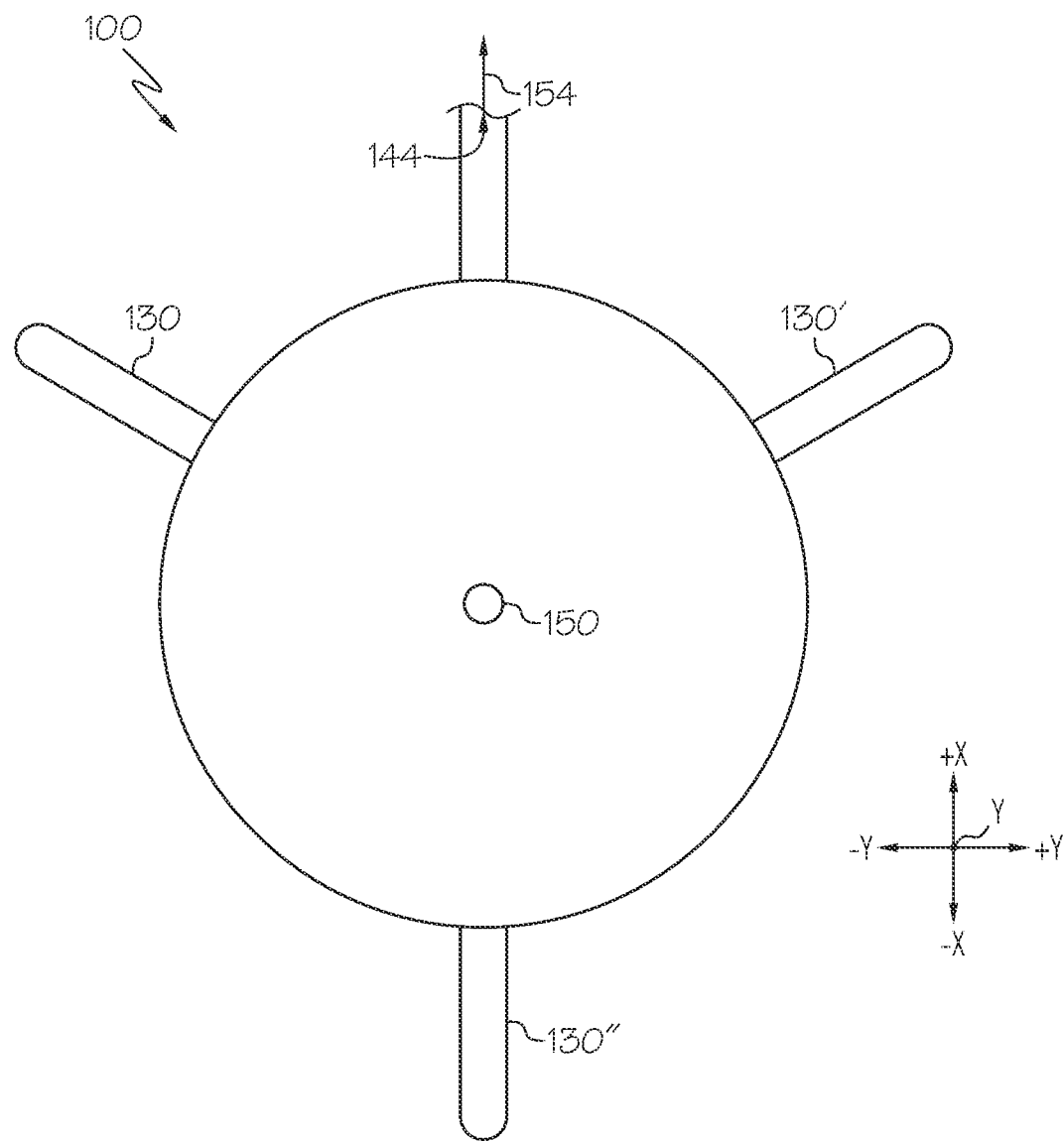
FIG. 9 schematically depicts a top view of a multi-zoned fluidized bed reactor system with three catalyst regeneration loops, according to one or more embodiments shown and described in the present disclosure.

Referring now to FIGS. 8-9, the multi-zoned fluidized bed reactor systems 100 of the present disclosure may comprise a plurality of catalyst regeneration loops 130, such as 2, 3, 4, 5, 6, or more than 6 catalyst regeneration loops 130. The plurality of catalyst regeneration loops 130 may each be in fluid communication with the stripping zone 120 and the reaction zone 122 the multi-zoned fluidized bed reactor 110. The plurality of catalyst regeneration loops 130 may be distributed around the circumference of the multi-zoned fluidized bed reactor 110. As shown in FIG. 8, the multi-zoned fluidized bed reactor 110 may have a first catalyst regeneration loop 130 and a second catalyst regeneration loop 130'. The second catalyst regeneration loop 130' may have all the same features and function of the first catalyst regeneration loop 130, as previously described in the present disclosure. The second catalyst regeneration loop 130' may include an inlet 131' and an outlet 132' of the second catalyst regeneration loop 130', a regeneration gas inlet 133', a flue gas outlet 135', a first slide valve 137', a second slide valve 138', and a catalyst inlet 214'. Similarly, the same or similar materials as the first catalyst regeneration loop 130 may flow into, through, or out of the second catalyst regeneration loop 130', such as a regeneration gas 134', a lifting gas 158', flue gas 136', a fraction of the portion 212' of spent catalyst 164 being removed from the second catalyst regeneration loop 130', and fresh catalyst 216'.

As shown in FIG. 9, the multi-zoned fluidized bed reactor 110 may have the first catalyst regeneration loop 130, the second catalyst regeneration loop 130', and a third catalyst regeneration loop 130". Again, the multi-zoned fluidized bed reactor systems 100 of the present disclosure may comprise a plurality of catalyst regeneration loops 130, such as 2, 3, 4, 5, 6, or more than 6 catalyst regeneration loops 130. The third catalyst regeneration loop 130" may have all the same features and function of the first catalyst regeneration loop 130 and the second catalyst regeneration loop 130', as previously described in the present disclosure.

Similar to the single catalyst regeneration loop 130, the plurality of catalyst regeneration loops 130 may each comprise a first slide valve 137 connecting the stripping zone 120 to each catalyst regeneration loop 130 and a second slide valve 138 connecting each catalyst regeneration loop 130 to the reaction zone 122. The first slide valves 137 of each catalyst regeneration loops 130 may be operable to withdraw spent catalyst 164 from the stripping zone 120 on a continuous basis. That is, individual ones of the plurality of catalyst regeneration loops 130 may still withdraw spent catalyst 164 from the stripping zone 120 on a batch-wise or semi-continuous basis. However, with each of the plurality of catalyst regeneration loops 130 operating in conjunction, spent catalyst 164 may be withdrawn from the stripping zone 120 on a continuous basis. Each of the plurality of catalyst regeneration loops 130 may be operated sequentially such that the regeneration of spent catalyst 164 simulates continuous regeneration of the spent catalyst 164. For example, a first one of the plurality of catalyst regeneration loops 130 may actively be regenerating spent catalyst 164 while the remaining ones of the plurality of catalyst regeneration loops 130 are not regenerating spent catalyst 164. The first catalyst regeneration loop 130 may be regenerating spent catalyst 164, the second catalyst regeneration loop 130' is transferring spent catalyst 164 from the multi-zoned fluidized bed reactor 110 into the second catalyst regeneration loop 130', and the third catalyst regeneration loop 130" may be transferring spent catalyst 164 from the third catalyst regeneration loop 130" into the multi-zoned fluidized bed reactor 110. In total, the plurality of catalyst regeneration loops 130 may operate in sequence to simulate continuous regeneration of spent catalyst 164. In such an embodiment, regenerated catalyst 166 may be introduced to the reaction zone 122 at a frequency that is less than the cycle time through a single catalyst regeneration loop 130. As used throughout the present disclosure, reference to a single catalyst regeneration loop 130 may also include an embodiment where a plurality of catalyst regeneration loops 130 are instead used.

Figure 10:
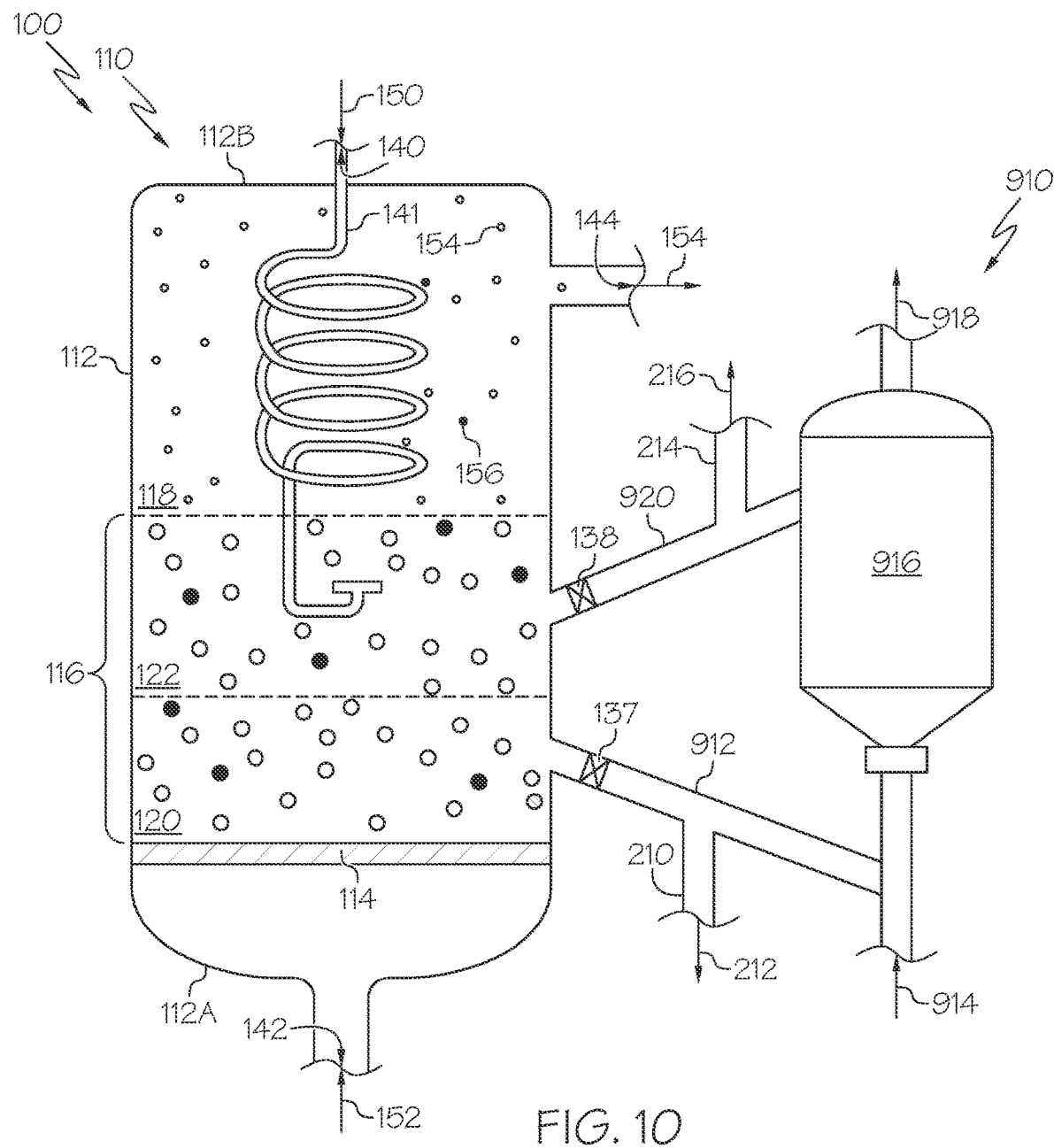
FIG. 10 schematically depicts a multi-zoned fluidized bed reactor system in which the catalyst regeneration loop includes a fluidized bed regenerator, according to one or more embodiments shown and described in the present disclosure.

Referring now to FIG. 10, the catalyst regeneration loop 130 may comprise a fluidized bed regenerator 910. That is, the catalyst regeneration loop 130 may transport the spent catalyst 164 in a cyclical manner between the multi-zoned fluidized bed reactor 110 and through the catalyst regeneration loop 130, which in FIG. 10 is a fluidized bed regenerator 910. In the fluidized bed regenerator 910, spent catalyst 164 may be transferred from the stripping zone 120 of the multi-zoned fluidized bed reactor 110 to the fluidized bed regenerator 910 via a first downwardly directed conduit 912. The spent catalyst 164 may be transported by lift forces from a combustion air stream 914 through a lift riser of the fluidized bed regenerator 910. The spent catalyst 164 may then be contacted with additional combustion air and undergo controlled combustion of any accumulated coke in a regeneration zone 916 of the fluidized bed regenerator 910. Flue gasses 198 may be removed from the regeneration zone 916. Regenerated catalyst 166 may then be returned to the reaction zone 122 of the multi-zoned fluidized bed reactor via a second downwardly directed conduit 920. In the regenerator, the heat produced from the combustion of any coke may be transferred to the catalyst 160, which may increase the temperature required to provide heat to the catalytic reaction in the fluidized catalyst bed 116 of the multi-zoned fluidized bed reactor 110. In embodiments, the fluidized bed regenerator 910 may be a riser regenerator.

Figure 3:
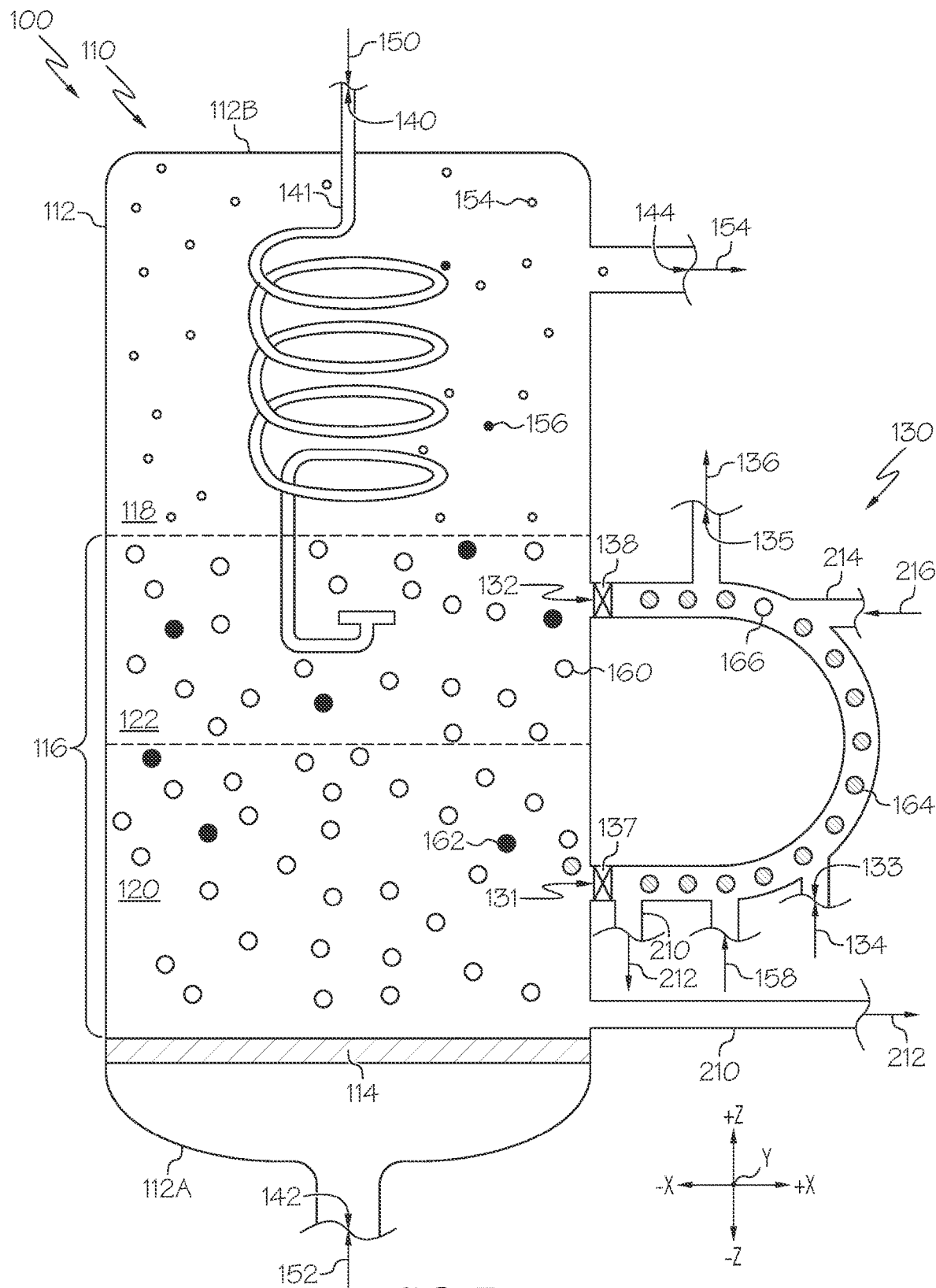
FIG. 3 schematically depicts a multi-zoned fluidized bed reactor system with a catalyst bleed, according to one or more embodiments shown and described in the present disclosure.

FIGS. 3-7 schematically depict various embodiments of the multi-zoned fluidized bed reactors 110. Each of FIGS. 3-7 will now be described in greater detail. Referring first to FIG. 3, the multi-zoned fluidized bed reactors 110 may include a catalyst bleed 210 at or near the bottom 112A of the housing 112 vertically above (e.g., in the +Z direction of the coordinate axis of FIGS. 3-10) the fluid bed distributor plate 114. In such an embodiment, a portion 212 of catalyst 160 may be removed from the fluidized catalyst bed 116 without the need to remove the catalyst 160 via the catalyst regeneration loop 130. During operation, portions 212 of the catalyst 160 may capture metals and other poisons that may permanently deactivate catalytically active sites on the catalyst. These portions 212 of the catalyst 160 may be concentrated at or near the bottom 112A of the housing 112 due to their increased density. These portions 212 of the catalyst 160 having an increased density may be removed via the catalyst bleed 210. A complimentary portion of fresh catalyst 216 may be fed to the multi-zoned fluidized bed reactor 110 via a catalyst inlet 214. In embodiments, the fresh catalyst 216 may be make-up catalyst. The fresh catalyst 216 may account for any portion 212 of catalyst 160 removed via the catalyst bleed 210. It should be noted that the catalyst bleed 210 and catalyst inlet 214 may be in addition or in the alternative to the catalyst inlet 214 and catalyst bleed 210 of the catalyst regeneration loop 130.

Figure 4:
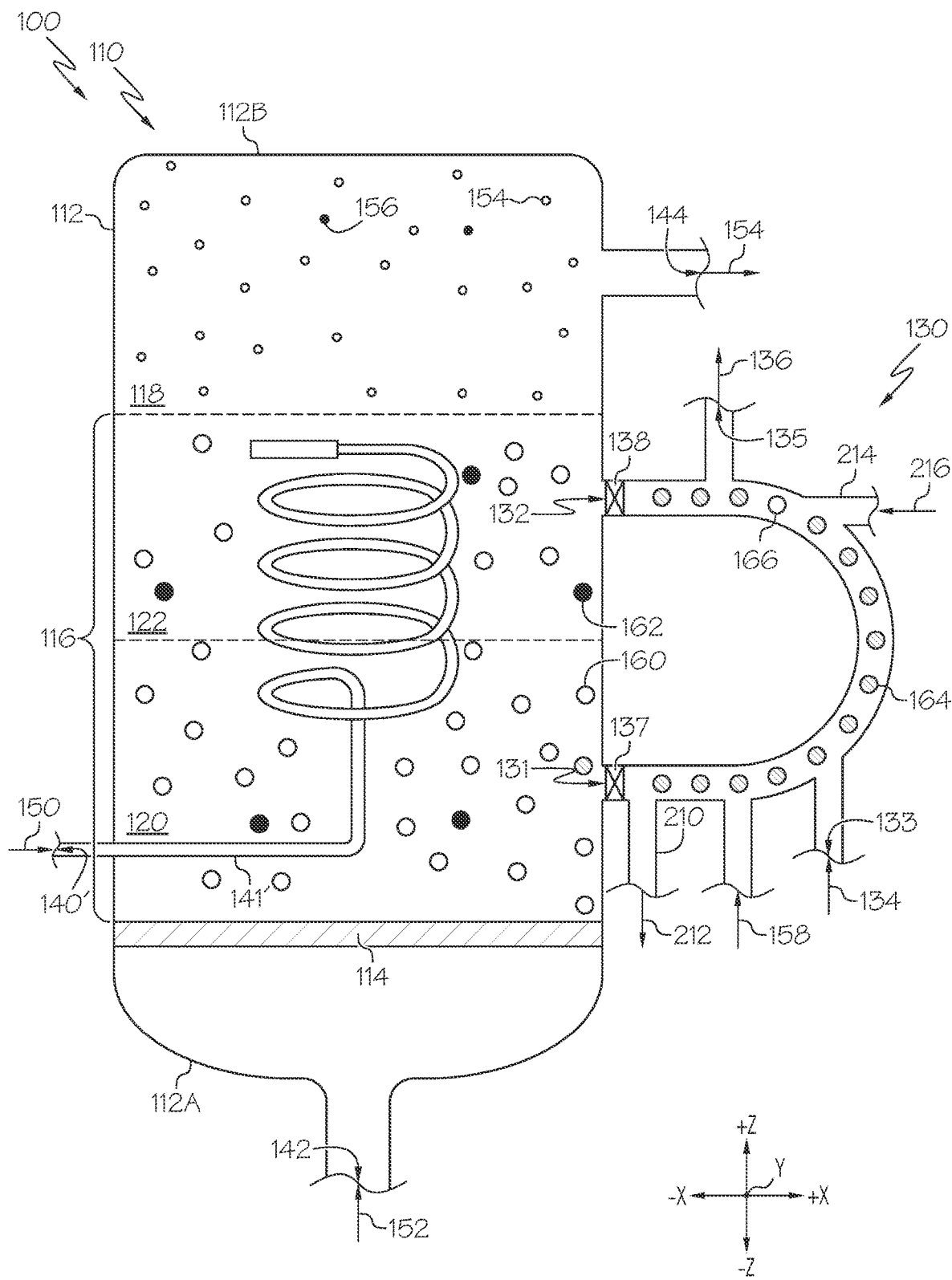
FIG. 4 schematically depicts a multi-zoned fluidized bed reactor system with a hydrocarbon feed at or near the bottom of the multi-zoned fluidized bed reactor, according to one or more embodiments shown and described in the present disclosure.

Referring now to FIG. 4, according to another embodiment, the hydrocarbon feed inlet 140 and the hydrocarbon feed coil pipe 141 may enter the multi-zoned fluidized bed reactor 110 at or near the bottom 112A of the housing 112. Instead of the hydrocarbon feed coil pipe 141 passing through the condensation zone 118 and into the reaction zone 122 (See FIGS. 1 and 3), the hydrocarbon feed coil pipe 141 may pass through the stripping zone 120 and into the reaction zone 122. In this embodiment, the hydrocarbon feed 150 may be preheated by the stripping zone 120. Additionally, the hydrocarbon feed 150 in the hydrocarbon feed coil pipe 141 may reduce overheating in the fluidized catalyst bed 116, as the hydrocarbon feed 150 in the hydrocarbon feed coil pipe 141 may absorb excess heat from the fluidized catalyst bed 116.

Figure 5:
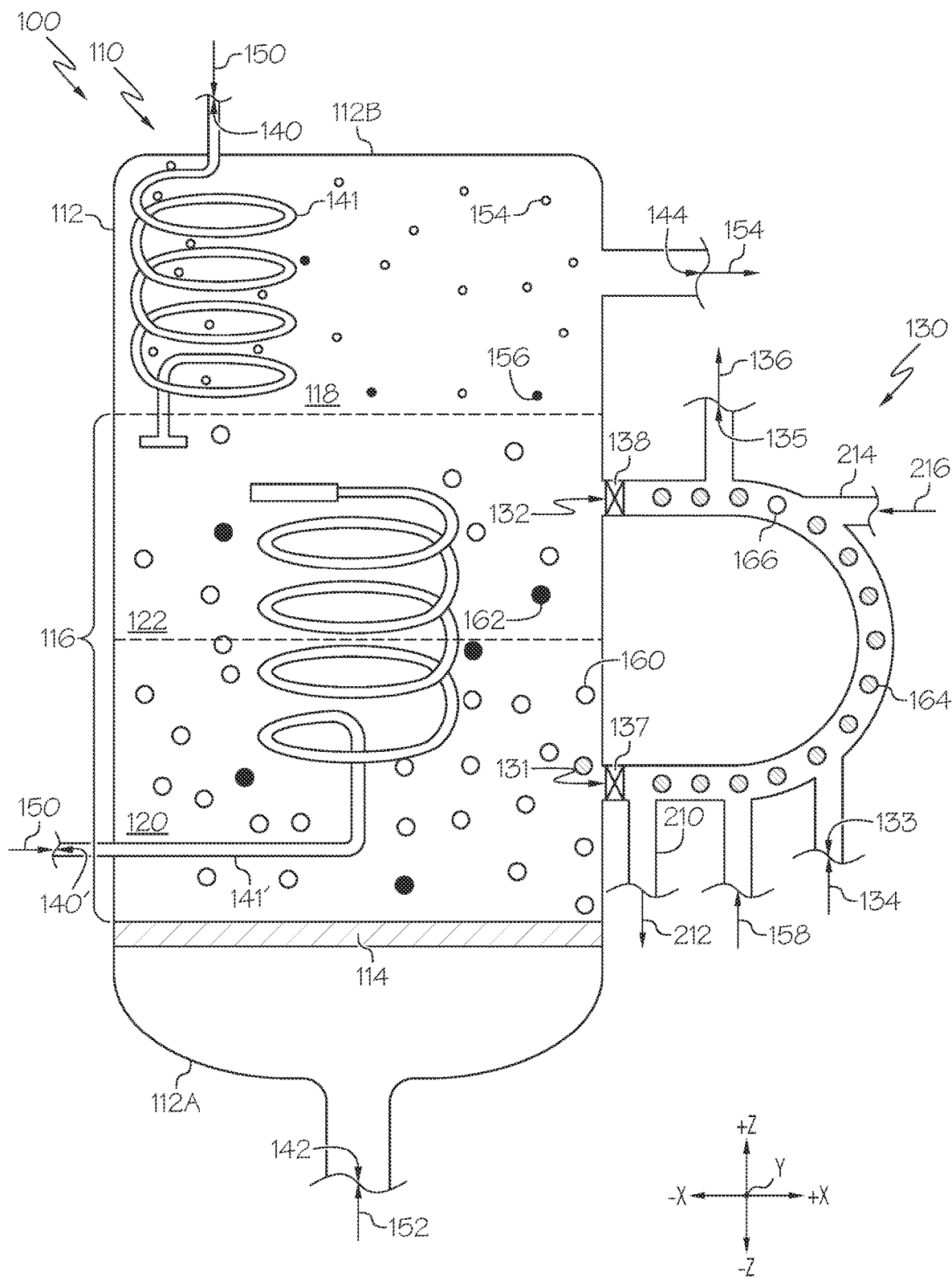
FIG. 5 schematically depicts a multi-zoned fluidized bed reactor system with two hydrocarbon feeds, according to one or more embodiments shown and described in the present disclosure.

Referring now to FIG. 5, according to another embodiment, the multi-zoned fluidized bed reactor 110 may include two hydrocarbon feed inlets and two hydrocarbon feed coil pipes. A first hydrocarbon feed inlet 140 and a first hydrocarbon feed coil pipe 141 may be similar to those depicted in FIGS. 1 and 3. The first hydrocarbon feed coil pipe 141 may enter the multi-zoned fluidized bed reactor 110 and pass through the condensation zone 118 and into the reaction zone 122. A second hydrocarbon feed inlet 140' and a second hydrocarbon feed coil pipe 141' may be similar to those depicted in FIG. 4. Referring again to FIG. 5, the second hydrocarbon feed coil pipe 141' may enter the multi-zoned fluidized bed reactor 110 and pass through the stripping zone 120 and into the reaction zone 122. In such an embodiment, separate portions of the hydrocarbon feed 150, 150' may be passed through both the condensation zone 118 and the stripping zone 120 by the first hydrocarbon feed coil pipe 141 and second hydrocarbon feed coil pipe 141', respectively. The portion of the hydrocarbon feed 150 being passed into the first hydrocarbon feed coil pipe 141 and portion of the hydrocarbon feed 150' being passed into the second hydrocarbon feed coil pipe 141' may be varied to assist in controlling the temperature in the fluidized catalyst bed 116 and the multi-zoned fluidized bed reactor 110. For instance, if the temperature in the fluidized catalyst bed 116 and the multi-zoned fluidized bed reactor 110 is too high, the hydrocarbon feed 150 in the first hydrocarbon feed coil pipe 141 may be varied such that the hydrocarbon feed 150 in the first hydrocarbon feed coil pipe 141 is greater than the hydrocarbon feed 150' in the second hydrocarbon feed coil pipe 141'. Alternatively, if the temperature in the fluidized catalyst bed 116 and the multi-zoned fluidized bed reactor 110 is too low, the hydrocarbon feed 150 in the first hydrocarbon feed coil pipe 141 or the hydrocarbon feed 150' in the second hydrocarbon feed coil pipe 141' may be varied such that the hydrocarbon feed 150' in the second hydrocarbon feed coil pipe 141' is greater than the hydrocarbon feed 150 in the first hydrocarbon feed coil pipe 141. The hydrocarbon feed 150' being passed into the second feed coil pipe 141' may have a hydrocarbon composition that is different from the hydrocarbon feed 150 being fed through the first hydrocarbon feed coil pipe 141. For instance, a light hydrocarbon fraction may be fed through inlet 140' while a heavier hydrocarbon fraction may be fed through unlet 140.

Figure 6:
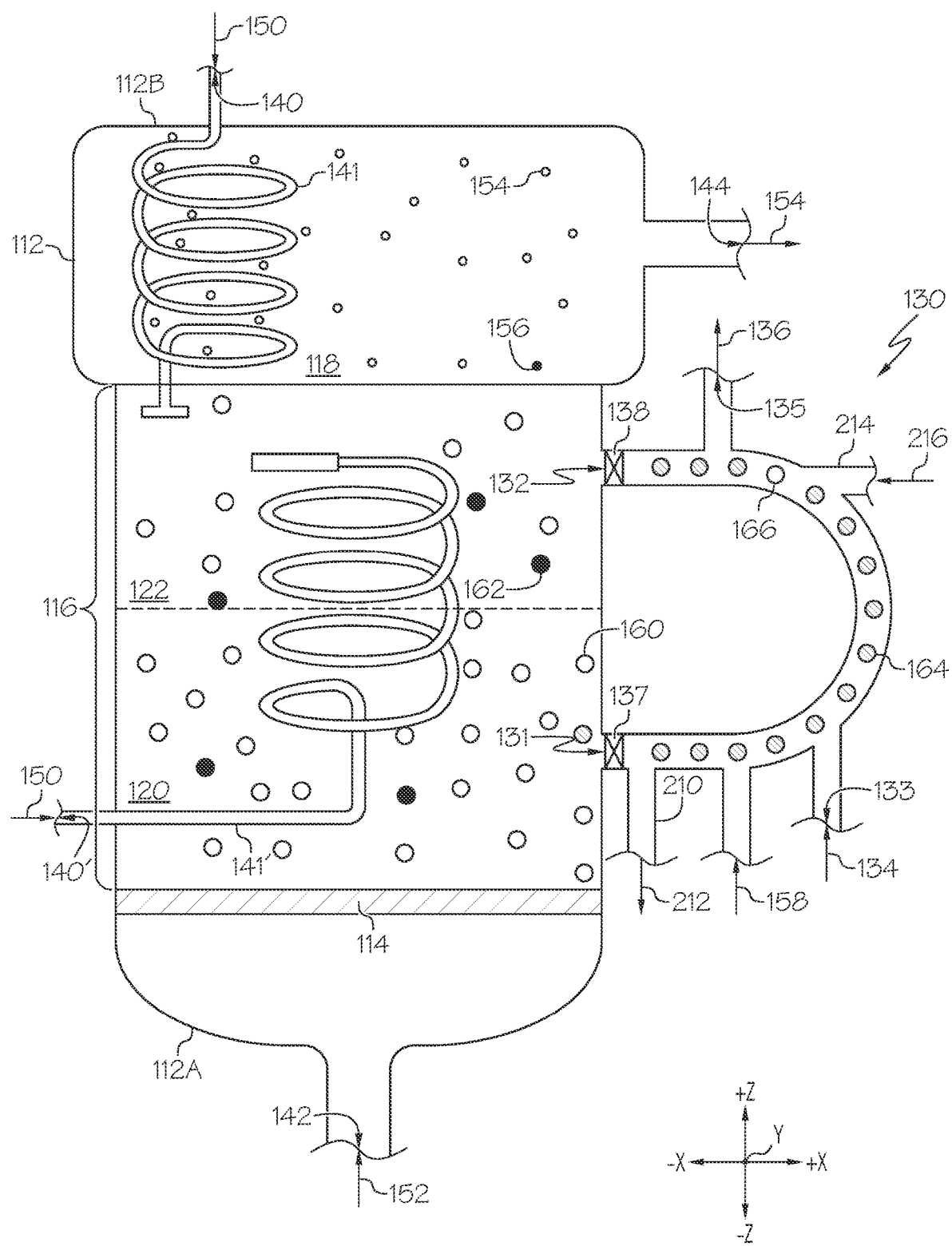
FIG. 6 schematically depicts a multi-zoned fluidized bed reactor system with a larger diameter in the condensation zone, according to one or more embodiments shown and described in the present disclosure.

Referring now to FIG. 6, according to yet another embodiment, the housing 112 of the multi-zoned fluidized bed reactor 110 may be modified such that the size (i.e., volume) of the condensation zone 118 may be larger than the stripping zone 120 and the reaction zone 122. In FIG. 6, the diameter of the condensation zone 118 is increased compared to the stripping zone 120 and the reaction zone 122. As previously discussed in the present disclosure, an increased volume in the condensation zone 118 may decrease the velocity of the one or more chemical products 156 or intermediates of the multi-zoned fluidized bed reactor effluent 154 passing vertically from the reaction zone 122 to the condensation zone 118. The decreased velocity of the one or more chemical products 156 or intermediates of the multi-zoned fluidized bed reactor effluent 154 in the condensation zone 118 may allow for an increased residence time of the one or more chemical products 156 and intermediates of the multi-zoned fluidized bed reactor effluent 154 in the condensation zone 118. The increased residence time of the one or more chemical products 156 or intermediates of the multi-zoned fluidized bed reactor effluent 154 in the condensation zone 118 may result in increased heat transfer between the one or more chemical products 156 or intermediates of the multi-zoned fluidized bed reactor effluent 154 and the hydrocarbon feed 150 in the hydrocarbon feed coil pipe 141. Additionally, the increased residence time of the one or more chemical products 156 or intermediates of the multi-zoned fluidized bed reactor effluent 154 in the condensation zone 118 may allow for more efficient condensation of heavier constituents of the chemical products 156, allowing the heavier constituents of the chemical products 156 to condense and return to the fluidized catalyst bed 116.

Figure 7:
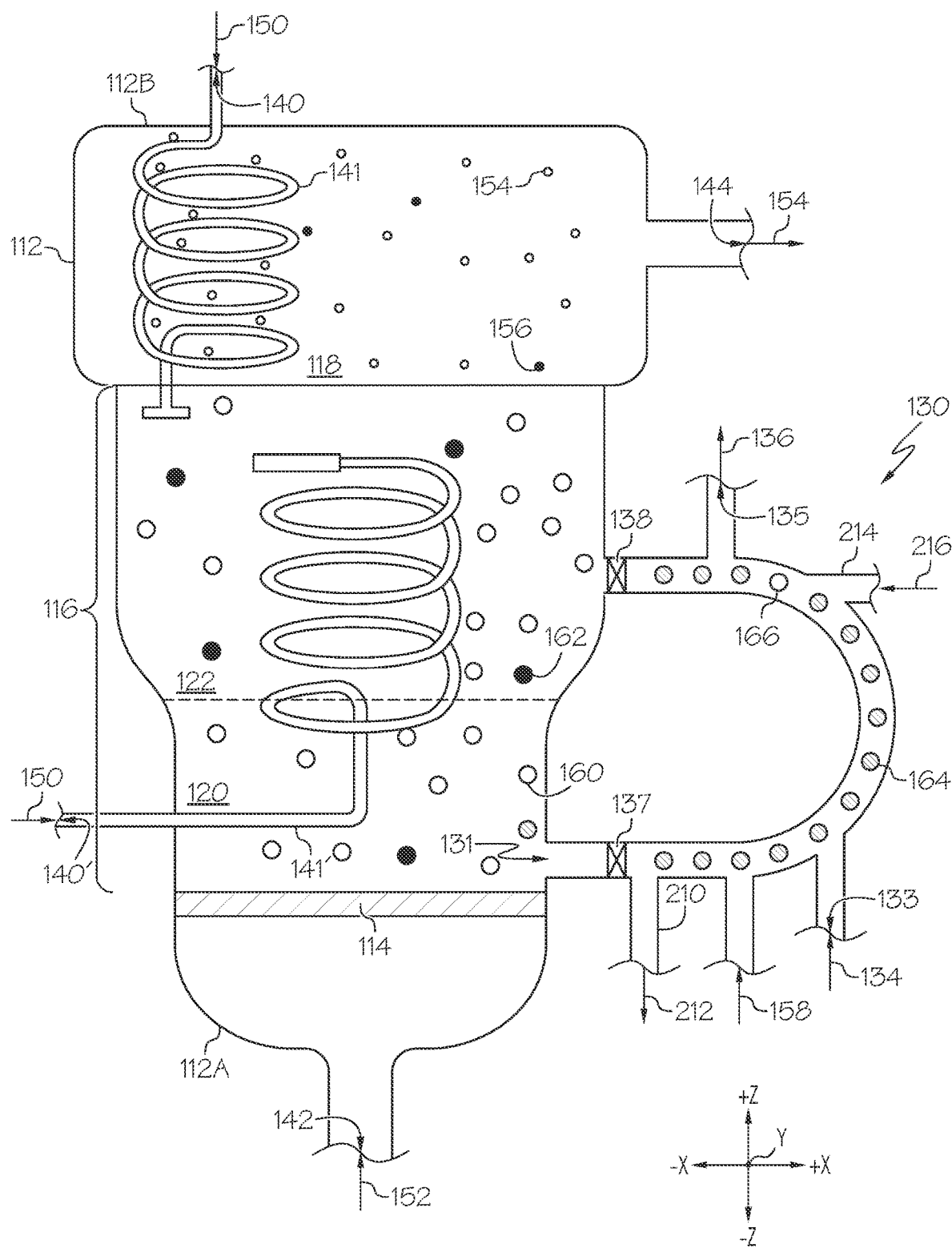
FIG. 7 schematically depicts a multi-zoned fluidized bed reactor system with varying diameters in the stripping zone, reaction zone, and condensation zone, according to one or more embodiments shown and described in the present disclosure.

Referring now to FIG. 7, according to still another embodiment, the stripping zone 120, the reaction zone 122, and the condensation zone 118 may all comprise different diameters, such that the size of each zone is varied. In this embodiment, the stripping zone 120 may have a smaller diameter than the reaction zone 122, and the reaction zone 122 may have a smaller diameter than the condensation zone 118. Varying the diameter of the stripping zone 120, the reaction zone 122, and the condensation zone 118 may allow for control and tailoring of ratios between the stripping zone 120, the reaction zone 122, and the condensation zone 118.

The features of any of FIG. 1-10 may be applicable to any other figure. One skilled in the art will appreciate that the various embodiments depicted in each figure may be easily adaptable to the remaining figures.

The multi-zoned fluidized bed reactors 110 of the present disclosure may be able to process various hydrocarbon feeds 150, including crude oil. Converting the hydrocarbon feed 150 to the one or more chemical products 156 or intermediates of the multi-zoned fluidized bed reactor effluent 154 may include loading a catalyst 160 into the fluidized catalyst bed 116 of the multi-zoned fluidized bed reactor 110. Converting the hydrocarbon feed 150 to the one or more chemical products 156 or intermediates of the multi-zoned fluidized bed reactor effluent 154 may also include supplying the hydrocarbon feed 150 to the reaction zone 122 of the multi-zoned fluidized bed reactors 110 and supplying the fluidization gas 152 to the reaction zone 122 through the stripping zone 120. After supplying both the hydrocarbon feed 150 and the fluidization gas 152 to the reaction zone 122, the hydrocarbon feed 150 may be contacted with the catalyst 160 at the reaction conditions. The contacting may cause at least a portion of the hydrocarbon feed 150 to be converted to the one or more chemical products 156 or intermediates of the multi-zoned fluidized bed reactor effluent 154. The one or more chemical products 156 or intermediates of the multi-zoned fluidized bed reactor effluent 154 may rise vertically to the condensation zone 118 where, prior to passing the multi-zoned fluidized bed reactor effluent 154 out of the multi-zoned fluidized bed reactor 110, heavier portions of the one or more chemical products 156 or intermediates of the multi-zoned fluidized bed reactor effluent 154 are condensed and returned to the reaction zone 122 for further conversion.

It is contemplated that any number of reactions may occur in the multi-zoned fluidized bed reactor 110. The hydrocarbon feed 150 and the desired one or more chemical products 156 or intermediates of the multi-zoned fluidized bed reactor effluent 154 may guide the type of reaction that is facilitated in the multi-zoned fluidized bed reactor 110. For example, the reaction may be a cracking reaction or dehydrogenation reaction. Similarly, it is contemplated that any number of catalysts 160 may be used in the multi-zoned fluidized bed reactor 110. Again, the hydrocarbon feed 150, reaction, and the desired one or more chemical products 156 or intermediates of the multi-zoned fluidized bed reactor effluent 154 may guide the catalyst 160 used in the multi-zoned fluidized bed reactor 110. If the reaction is a cracking reaction or a dehydrogenation reaction, a cracking catalyst or dehydrogenation catalyst may be used. One skilled in the art will recognize and appreciate that the multi-zoned fluidized bed reactor 110 of the present disclosure will have applicability to numerous different hydrocarbon feeds 150, reactions, catalysts 160, and the one or more chemical products 156 or intermediates of the multi-zoned fluidized bed reactor effluent 154.

Referring again to FIG. 1, methods of regenerating catalyst 160 in multi-zoned fluidized bed reactors 110 may include passing a portion of spent catalyst 164 from a stripping zone 120 of the multi-zoned fluidized bed reactor 110 to a catalyst regeneration loop 130 of the multi-zoned fluidized bed reactor 110, contacting the portion of spent catalyst 164 with a regeneration gas 134 in the catalyst regeneration loop 130 to produce regenerated catalyst 166, separating flue gas 136, water vapor, or both from the regenerated catalyst 166 in the catalyst regeneration loop 130, and returning the regenerated catalyst 166 from the catalyst regeneration loop 130 to a reaction zone 122 of the multi-zoned fluidized bed reactor 110.

The methods of regenerating catalyst 160 in the multi-zoned fluidized bed reactor 110 may include passing a portion of spent catalyst 164 from a stripping zone 120 of the multi-zoned fluidized bed reactor 110 to a catalyst regeneration loop 130 of the multi-zoned fluidized bed reactor 110. The multi-zoned fluidized bed reactor 110 may have any of the features, catalysts 160, or operating conditions previously discussed in this disclosure for the multi-zoned fluidized bed reactor 110. Similarly, the catalyst regeneration loop 130 may have any of the features, catalysts 160, or operating conditions previously discussed in this disclosure for the catalyst regeneration loop 130.

The method of regenerating catalyst 160 in the multi-zoned fluidized bed reactor system 100 may include passing the portion of spent catalyst 164 in the stripping zone 120 to the catalyst regeneration loop 130 on a batch-wise or semi-continuous basis. The passing of the portion of spent catalyst 164 from the stripping zone 120 to the catalyst regeneration loop 130 may be controlled by operating a slide valve proximate the inlet 131 of the catalyst regeneration loop 130.

The method of regenerating catalyst 160 in the multi-zoned fluidized bed reactor system 100 may include maintaining the pressure in the catalyst regeneration loop 130 at a greater pressure than a pressure in the stripping zone 120 and the reaction zone 122. By maintaining different pressures in the catalyst regeneration loop 130 and the stripping zone 120 and the reaction zone 122, catalyst 160 may efficiently pass into and out of the catalyst regeneration loop 130.

One or more aspects of the present disclosure are described here. A first aspect of the present disclosure may include a multi-zoned fluidized bed reactor system comprising a multi-zoned fluidized bed reactor. The multi-zoned fluidized bed reactor may comprise a housing, a fluid bed distributor plate positioned at the bottom of the housing, a fluidized catalyst bed disposed vertically above the fluid bed distributor plate, and a condensation zone disposed vertically above the fluidized catalyst bed. The fluidized catalyst bed may comprise a stripping zone and a reaction zone disposed vertically above the stripping zone. The multi-zoned fluidized bed rector system may further include at least one catalyst regeneration loop fluidly coupled to the stripping zone and the reaction zone, where an inlet of the at least one catalyst regeneration loop may be in fluid communication with the stripping zone of the fluidized catalyst bed, and an outlet of the at least one catalyst regeneration loop may be in fluid communication with the reaction zone of the fluidized catalyst bed. The at least one catalyst regeneration loop may be operable to withdraw a portion of spent catalyst from the stripping zone, regenerate the portion of spent catalyst to produce regenerated catalyst, and return the regenerated catalyst to the reaction zone.

A second aspect of the present disclosure may include the first aspect, where the at least one catalyst regeneration loop may further comprise a first slide valve connecting the stripping zone to the at least one catalyst regeneration loop and a second slide valve connecting the at least one catalyst regeneration loop to the reaction zone. The first slide valve may be operable to control the portion of spent catalyst withdrawn from the stripping zone, and the second slide valve may be operable to control the regenerated catalyst returned to the reaction zone.

A third aspect of the present disclosure may include the second aspect, where the first slide valve may be operable to withdraw spent catalyst from the stripping zone on a batch-wise or semi-continuous basis.

A fourth aspect of the present disclosure may include any of the first through third aspects, where the at least one catalyst regeneration loop may further comprise a regeneration gas inlet in fluid communication with the at least one catalyst regeneration loop. The at least one catalyst regeneration loop may be operable to combine a regeneration gas with the portion of spent catalyst in the at least one catalyst regeneration loop.

A fifth aspect of the present disclosure may include any of the first through fourth aspects, in which the catalyst regeneration loop may be operable to combust a portion of coke present on the spent catalyst while the spent catalyst is in the at least one catalyst regeneration loop.

A sixth aspect of the present disclosure may include any of the first through fifth aspects, further comprising a flue gas outlet in fluid communication with the at least one catalyst regeneration loop. The flue gas outlet may be operable to remove a portion of a flue gas from the regenerated catalyst in the at least one catalyst regeneration loop.

A seventh aspect of the present disclosure may include the sixth aspect, in which the flue gas may comprise carbon monoxide, carbon dioxide, or a combination of both.

An eighth aspect of the present disclosure may include either the sixth or seventh aspect, where the flue gas outlet may be in fluid communication with a heat recovery unit to pass the portion of the flue gas to the heat recovery unit.

A ninth aspect of the present disclosure may include the eighth aspect, where the heat recovery unit may be operable to preheat a hydrocarbon feed or to generate high-pressure steam.

A tenth aspect of the present disclosure may include any of the first through ninth aspects, comprising a plurality of catalyst regeneration loops, where each of the plurality of catalyst regeneration loops may be in fluid communication with the stripping zone and the reaction zone of the multi-zoned fluidized bed reactor.

An eleventh aspect of the present disclosure may include the tenth aspect, where each of the plurality of catalyst regeneration loops may comprise a first slide valve connecting the stripping zone to the catalyst regeneration loop and a second slide valve connecting the catalyst regeneration loop to the reaction zone. The first slide valve of each of the plurality of catalyst regeneration loops may be operable to withdraw spent catalyst from the stripping zone.

A twelfth aspect of the present disclosure may include the eleventh aspect, where the plurality of catalyst regeneration loops may be operated in sequence to simulate continuous regeneration of the catalyst.

A thirteenth aspect of the present disclosure may include any one of the first through twelfth aspects, where the at least one catalyst regeneration loop may comprise a fluidized bed regenerator.

A fourteenth aspect of the present disclosure may include any one of the first through thirteenth aspects, where the at least one catalyst regeneration loop may comprise a bubbling fluidization bed or a turbulent fluidization bed.

A fifteenth aspect of the present disclosure may include any one of the first through fourteenth aspects, where the at least one catalyst regeneration loop may be operable to contact the portion of the spent catalyst with a regeneration gas at a temperature of from 500 degrees Celsius to 800 degrees Celsius.

A sixteenth aspect of the present disclosure may include any one of the first through fifteenth aspects, where the at least one catalyst regeneration loop may be operable to contact the portion of the spent catalyst with a regeneration gas at a pressure of from 1 bar to 5 bar.

A seventeenth aspect of the present disclosure may include any one of the first through sixteenth aspects, where the at least one catalyst regeneration loop may be operable to contact the portion of the spent catalyst with a regeneration gas at a residence time of less than twenty minutes.

An eighteenth aspect of the present disclosure may include any one of the first through seventeenth aspects, where the at least one catalyst regeneration loop may further comprise a catalyst bleed in fluid communication with the at least one catalyst regeneration loop. The catalyst bleed may be operable to remove a fraction of the portion of spent catalyst from the at least one catalyst regeneration loop.

A nineteenth aspect of the present disclosure may include the eighteenth aspect, where the catalyst bleed may be operable to remove the fraction of the portion of spent catalyst of from 0.1 weight percent to 5.0 weight percent of the portion of spent catalyst in the at least one catalyst regeneration loop.

A twentieth aspect of the present disclosure may include any one of the first through nineteenth aspects, where the at least one catalyst regeneration loop may further comprise a catalyst inlet in fluid communication with the at least one catalyst regeneration loop. The catalyst inlet may be operable to introduce fresh catalyst to the catalyst regeneration loop.

A twenty-first aspect of the present disclosure may include any one of the first through twentieth aspects, where the multi-zoned fluidized bed reactor may further comprise a catalyst bleed in fluid communication with the stripping zone. The catalyst bleed may be operable to remove a portion of catalyst from the multi-zoned fluidized bed reactor.

A twenty-second aspect of the present disclosure may include any one of the first through twenty-first aspects, where a diameter of the condensation zone may be greater than a diameter of both the reaction zone and the stripping zone.

A twenty-third aspect of the present disclosure may include any one of the first through twenty-second aspects, where a diameter of the condensation zone may be greater than a diameter of the reaction zone. The diameter of the reaction zone may be greater than a diameter of the stripping zone.

A twenty-fourth aspect of the present disclosure may include a method of regenerating catalyst in a multi-zoned fluidized bed reactor comprising passing a portion of spent catalyst from a stripping zone of the multi-zoned fluidized bed reactor to a catalyst regeneration loop of the multi-zoned fluidized bed reactor, contacting the portion of spent catalyst with a regeneration gas in the catalyst regeneration loop to produce regenerated catalyst, separating flue gas, water vapor, or both from the regenerated catalyst in the catalyst regeneration loop, and returning the regenerated catalyst from the catalyst regeneration loop to a reaction zone of the multi-zoned fluidized bed reactor. The multi-zoned fluidized bed reactor may comprise a fluidized catalyst bed and a condensation zone disposed vertically above the fluidized catalyst bed. The fluidized catalyst bed may comprise the stripping zone and a reaction zone disposed vertically above the striping zone. An inlet of the catalyst regeneration loop may be in fluid communication with the stripping zone of the fluidized catalyst bed. An outlet of the catalyst regeneration loop may be in fluid communication with the reaction zone of the fluidized catalyst bed.

A twenty-fifth aspect of the present disclosure may include, any one of the twenty-fourth through thirty-first aspects, comprising passing the portion of spent catalyst in the stripping zone to the catalyst regeneration loop on a batch-wise or semi-continuous basis.

A twenty-sixth aspect of the present disclosure may include the twenty-fifth aspect, comprising controlling the passing of the portion of spent catalyst from the stripping zone to the catalyst regeneration loop by operating a slide valve proximate the inlet of the catalyst regeneration loop.

A twenty-seventh aspect of the present disclosure may include any one of the twenty-fourth through twenty-sixth aspects, where the regeneration gas may comprise air, oxygen, nitrogen, steam, or combinations of these.

A twenty-eighth aspect of the present disclosure may include the twenty-seventh aspect, where the steam may comprise high-pressure steam.

A twenty-ninth aspect of the present disclosure may include any one of the twenty-fourth through twenty-eighth aspects, where contacting the portion of spent catalyst with a regeneration gas in the catalyst regeneration loop may cause at least a portion of coke present on the spent catalyst to undergo combustion.

A thirtieth aspect of the present disclosure may include any one of the twenty-fourth through twenty-ninth aspects, further comprising recovering heat from the flue gas, water vapor, or both separated from the regenerated catalyst in the catalyst regeneration loop.

A thirty-first aspect of the present disclosure may include the thirtieth aspect, comprising preheating a hydrocarbon feed or generating high-pressure steam using the flue gas, water vapor, or both separated from the regenerated catalyst in the catalyst regeneration loop.

A thirty-second aspect of the present disclosure may include any one of the twenty-fourth through thirty-first aspects, where the flue gas may comprise carbon monoxide, carbon dioxide, or a combination of both.

A thirty-third aspect of the present disclosure may include any one of the twenty-fourth through thirty-second aspects, further comprising passing the portion of spent catalyst from the stripping zone of the multi-zoned fluidized bed reactor to a plurality of catalyst regeneration loops of the multi-zoned fluidized bed reactor.

A thirty-fourth aspect of the present disclosure may include the thirty-third aspect, comprising operating the plurality of catalyst regeneration loops in sequence to simulate continuous regeneration of the catalyst.

A thirty-fifth aspect of the present disclosure may include any one of the twenty-fourth through thirty-fourth aspects, where the catalyst regeneration loop may comprise a fluidized bed regenerator and the method may comprise passing the portion of the spent catalyst to the fluidized bed regenerator.

A thirty-sixth aspect of the present disclosure may include any one of the twenty-fourth through thirty-fifth aspects, where the catalyst regeneration loop may comprise a bubbling fluidization bed or turbulent fluidization bed.

A thirty-seventh aspect of the present disclosure may include any one of the twenty-fourth through thirty-sixth aspects, comprising operating the catalyst regeneration loop at a temperature ranging from 500 degrees Celsius to 800 degrees Celsius.

A thirty-eighth aspect of the present disclosure may include any one of the twenty-fourth through thirty-seventh aspects, comprising operating the catalyst regeneration loop at a pressure ranging from 1 bar to 5 bar.

A thirty-ninth aspect of the present disclosure may include any one of the twenty-fourth through thirty-eighth aspects, where the residence time of the portion of spent catalyst in the catalyst regeneration loop may be less than twenty minutes.

A fortieth aspect of the present disclosure may include any one of the twenty-fourth through thirty-ninth aspects, further comprising removing a fraction of the portion of spent catalyst from the catalyst regeneration loop.

A forty-first aspect of the present disclosure may include the fortieth aspect, where the fraction of the portion of spent catalyst may comprise 0.1 weight percent to 5.0 weight percent of the portion of spent catalyst.

A forty-second aspect of the present disclosure may include any one of the twenty-fourth through forty-first aspects, further comprising adding fresh catalyst to the regenerated catalyst in the catalyst regeneration loop.

A forty-third aspect of the present disclosure may include any one of the twenty-fourth through forty-second aspects, comprising maintaining the pressure in the catalyst regeneration loop at a greater pressure than a pressure in the stripping zone and the reaction zone.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A multi-zoned fluidized bed reactor system comprising:
a multi-zoned fluidized bed reactor comprising a housing, a fluid bed distributor plate positioned at the bottom of the housing, a fluidized catalyst bed disposed vertically above the fluid bed distributor plate and a condensation zone disposed vertically above the fluidized catalyst bed, where:
the fluidized catalyst bed comprises a stripping zone and a reaction zone disposed vertically above the stripping zone;
at least one catalyst regeneration loop fluidly coupled to the stripping zone and the reaction zone, where:
an inlet of the at least one catalyst regeneration loop is in fluid communication with the stripping zone of the fluidized catalyst bed; and
an outlet of the at least one catalyst regeneration loop is in fluid communication with the reaction zone of the fluidized catalyst bed;
where the at least one catalyst regeneration loop is operable to withdraw a portion of spent catalyst from the stripping zone, regenerate the portion of spent catalyst to produce regenerated catalyst, and return the regenerated catalyst to the reaction zone.

2. The multi-zoned fluidized bed reactor system of claim 1, where the at least one catalyst regeneration loop further comprises:
a first slide valve connecting the stripping zone to the at least one catalyst regeneration loop; and
a second slide valve connecting the at least one catalyst regeneration loop to the reaction zone;
where:
the first slide valve is operable to control the portion of spent catalyst withdrawn from the stripping zone on a batch-wise or semi-continuous basis; and
the second slide valve is operable to control the regenerated catalyst returned to the reaction zone.

3. The multi-zoned fluidized bed reactor system of claim 1, where the at least one catalyst regeneration loop further comprises a regeneration gas inlet in fluid communication with the at least one catalyst regeneration loop, where the at least one catalyst regeneration loop is operable to combine a regeneration gas with the portion of spent catalyst in the at least one catalyst regeneration loop.

4. The multi-zoned fluidized bed reactor system of claim 1, further comprising a flue gas outlet in fluid communication with the at least one catalyst regeneration loop, where:
the flue gas outlet is operable to remove a portion of a flue gas from the regenerated catalyst in the at least one catalyst regeneration loop; and
the flue gas outlet is in fluid communication with a heat recovery unit to pass the portion of the flue gas to the heat recovery unit.

5. The multi-zoned fluidized bed reactor system of claim 4, where the heat recovery unit is operable to preheat a hydrocarbon feed or to generate high-pressure steam.

6. The multi-zoned fluidized bed reactor system of claim 1, comprising a plurality of catalyst regeneration loops, where each of the plurality of catalyst regeneration loops are in fluid communication with the stripping zone and the reaction zone the multi-zoned fluidized bed reactor.

7. The multi-zoned fluidized bed reactor system of claim 6, where:
each of the plurality of catalyst regeneration loops comprise a first slide valve connecting the stripping zone to the catalyst regeneration loop and a second slide valve connecting the catalyst regeneration loop to the reaction zone; and
the first slide valve of each of the plurality of catalyst regeneration loops is operable to withdraw spent catalyst from the stripping zone.

8. The multi-zoned fluidized bed reactor system of claim 7, where the plurality of catalyst regeneration loops are operated in sequence to simulate continuous regeneration of the catalyst.

9. The multi-zoned fluidized bed reactor system of claim 1, where the at least one catalyst regeneration loop comprises a fluidized bed regenerator, a bubbling fluidization bed, or a turbulent fluidization bed.

10. The multi-zoned fluidized bed reactor system of claim 1, where the at least one catalyst regeneration loop further comprises a catalyst bleed in fluid communication with the at least one catalyst regeneration loop, where:
the catalyst bleed is operable to remove a fraction of the portion of spent catalyst from the at least one catalyst regeneration loop; and
the catalyst bleed is operable to remove the fraction of the portion of spent catalyst of from 0.1 weight percent to 5.0 weight percent of the portion of spent catalyst in the at least one catalyst regeneration loop.

11. The multi-zoned fluidized bed reactor system of claim 1, where the at least one catalyst regeneration loop further comprises a catalyst inlet in fluid communication with the at least one catalyst regeneration loop, where the catalyst inlet is operable to introduce fresh catalyst to the catalyst regeneration loop.

12. The multi-zoned fluidized bed reactor system of claim 1, where the multi-zoned fluidized bed reactor further comprises a catalyst bleed in fluid communication with the stripping zone, where the catalyst bleed is operable to remove a portion of catalyst from the multi-zoned fluidized bed reactor.

13. A method of regenerating catalyst in a multi-zoned fluidized bed reactor comprising:
passing a portion of spent catalyst from a stripping zone of the multi-zoned fluidized bed reactor to a catalyst regeneration loop of the multi-zoned fluidized bed reactor;
contacting the portion of spent catalyst with a regeneration gas in the catalyst regeneration loop to produce regenerated catalyst;
separating flue gas, water vapor, or both from the regenerated catalyst in the catalyst regeneration loop; and
returning the regenerated catalyst from the catalyst regeneration loop to a reaction zone of the multi-zoned fluidized bed reactor, where:
the multi-zoned fluidized bed reactor comprises a fluidized catalyst bed and a condensation zone disposed vertically above the fluidized catalyst bed;
the fluidized catalyst bed comprises the stripping zone and a reaction zone disposed vertically above the striping zone;
an inlet of the catalyst regeneration loop is in fluid communication with the stripping zone of the fluidized catalyst bed; and
an outlet of the catalyst regeneration loop is in fluid communication with the reaction zone of the fluidized catalyst bed.

14. The method of claim 13, comprising passing the portion of spent catalyst in the stripping zone to the catalyst regeneration loop on a batch-wise or semi-continuous basis.

15. The method of claim 14, comprising controlling the passing of the portion of spent catalyst from the stripping zone to the catalyst regeneration loop by operating a slide valve proximate the inlet of the catalyst regeneration loop.

16. The method of claim 13, further comprising recovering heat from the flue gas, water vapor, or both separated from the regenerated catalyst in the catalyst regeneration loop; and preheating a hydrocarbon feed or generating high-pressure steam using the flue gas, water vapor, or both separated from the regenerated catalyst in the catalyst regeneration loop.

17. The method of claim 13, further comprising passing the portion of spent catalyst from the stripping zone of the multi-zoned fluidized bed reactor to a plurality of catalyst regeneration loops of the multi-zoned fluidized bed reactor.

18. The method of claim 17, comprising operating the plurality of catalyst regeneration loops in sequence to simulate continuous regeneration of the catalyst.

19. The method of claim 13, comprising operating the catalyst regeneration loop at a temperature ranging from 500 degrees Celsius to 800 degrees Celsius, a pressure ranging from 1 bar to 5 bar, a residence time of the portion of spent catalyst in the catalyst regeneration loop of less than or equal to 20 minutes, or combinations of these.

20. The method of claim 13, further comprising removing a fraction of the portion of spent catalyst from the catalyst regeneration loop, where the fraction of the portion of spent catalyst comprises 0.1 weight percent to 5.0 weight percent of the portion of spent catalyst.

* * * * *